US009917723B2

(12) United States Patent
Yue et al.

(10) Patent No.: US 9,917,723 B2
(45) Date of Patent: Mar. 13, 2018

(54) EFFICIENT METHODS AND RECURSIVE/SCALABLE CIRCUIT ARCHITECTURES FOR QAM SYMBOL MEAN AND VARIANCE ESTIMATIONS

(71) Applicant: Futurewei Technologies, Inc., Plano, TX (US)

(72) Inventors: Guosen Yue, Edison, NJ (US); Xiao Feng Qi, Westfield, NJ (US)

(73) Assignee: FUTUREWEI TECHNOLOGIES, INC., Plano, TX (US)

( * ) Notice: Subject to any disclaimer, the term of this patent is extended or adjusted under 35 U.S.C. 154(b) by 0 days.

(21) Appl. No.: 15/065,072

(22) Filed: Mar. 9, 2016

(65) Prior Publication Data

US 2017/0264478 A1 Sep. 14, 2017

(51) Int. Cl.

| | |
|---|---|
| ***H04L 27/36*** | (2006.01) |
| ***H04L 25/02*** | (2006.01) |
| ***H04L 27/38*** | (2006.01) |
| *H04L 25/06* | (2006.01) |
| *H04L 1/06* | (2006.01) |
| *H04L 1/00* | (2006.01) |
| *H04L 27/26* | (2006.01) |
| *H04L 25/03* | (2006.01) |

(52) U.S. Cl.

CPC .......... *H04L 27/366* (2013.01); *H04L 1/0054* (2013.01); *H04L 25/024* (2013.01);

(Continued)

(58) Field of Classification Search

CPC ....... H04L 1/005; H04L 1/0054; H04L 27/38; H04L 1/0048; H04L 1/0631;

(Continued)

(56) References Cited

U.S. PATENT DOCUMENTS

| | | | | |
|---|---|---|---|---|
| 2006/0140295 A1 | 6/2006 | Jeong | | |
| 2007/0041475 A1* | 2/2007 | Koshy | H04L 1/0048 375/340 | |

(Continued)

FOREIGN PATENT DOCUMENTS

| | | |
|---|---|---|
| CN | 103326976 A | 9/2013 |
| WO | 2006066445 A1 | 6/2006 |

OTHER PUBLICATIONS

Yue et al., "Iterative MMSE-SIC Receiver with Low-Complexity Soft Symbol and Residual Interference Estimations", 2013 Asilomar Conference on Signals, Systems and Computers, IEEE, Nov. 2013, 5 pages.

(Continued)

*Primary Examiner* — Sophia Vlahos

(74) *Attorney, Agent, or Firm* — Vierra Magen Marcus LLP

(57) ABSTRACT

Circuits for producing signals representative of mean and variance estimations for quadrature amplitude modulation (QAM) are provided where the circuits comprise: sequentially repeated first circuit modules and sequentially repeated second circuit modules configured for producing updates in the corresponding estimation iterations. In one embodiment, a closest negative integer power of 2 is used as a substitute multiplicand when multiplying together two or more outputs of hyperbolic function generating units where the substituted for output is less than one. Size and complexity of the corresponding multiplier can then be reduced.

12 Claims, 11 Drawing Sheets

(52) U.S. Cl.
CPC ........ *H04L 27/3818* (2013.01); *H04L 1/0048* (2013.01); *H04L 1/0631* (2013.01); *H04L 25/0328* (2013.01); *H04L 25/067* (2013.01); *H04L 27/2647* (2013.01)

(58) Field of Classification Search
CPC ............... H04L 25/0328; H04L 25/067; H04L 27/2647; H04L 27/366; H04L 25/024; H04L 27/3818
See application file for complete search history.

(56) References Cited

U.S. PATENT DOCUMENTS

| | | | | | |
|---|---|---|---|---|---|
| 2012/0155560 | A1* | 6/2012 | Koshy | H04L 25/067 | 375/260 |
| 2013/0279559 | A1* | 10/2013 | Samuel Bebawy | H04L 25/03012 | 375/233 |
| 2014/0270023 | A1* | 9/2014 | Yue | H04L 27/02 | 375/353 |
| 2015/0078183 | A1 | 3/2015 | Cao et al. | | |
| 2016/0110201 | A1* | 4/2016 | Carlson | G06F 9/3867 | 712/215 |

OTHER PUBLICATIONS

Yue et al., "Low-Complexity Methods for Soft Estimation of QAM Symbols", 2013 47th Annual Conference on Information Sciences and Systems (CISS), Mar. 20-22, 2013, 6 pages.
PCT/CN2017/076121, ISR, dated Jun. 12, 2017.

* cited by examiner

100

Non-iterative
Opt.
Approx. method
Approx. Method I
Approx. Method I w/ Protection
Approx. Method II
203/204
205B
205C
205D
dashed line: first iteration
solid line: eighth iteration
205B/C"
205B/C'
205D"
203/204'
203/204"
205C"
SNR2A
SNR2B
201
202
BLER
SNR (dB)

Multiplier Heavy First Iteration Method

Scalable Pipeline For Adaptively Variable Q

501

Multiplier Light Pipeline For Approximate Mean Estimation

502

LUT and Multiplier Light Pipeline For Adaptively Variable Q

503

LUT and Multiplier Light Pipeline For Adaptively Variable Q

504

Second Moment Estimating Circuit for Adaptively Variable Q
600
Q=2, step1: λ2
Q=3, step2: λ3
Q=4, step3: λ4
tanh (-λ2/2)
tanh (-λ3/2)
tanh (-λ4/2)
612
LUT (or other function generator)
622
632
623
2
1
ζ of step 1
ζ of step 2
633
Reg P"
CLK
Update of ζ's
626
636
646
4
5
21
85
4η +Cq
627
637
647
628
638
648
A2 16QAM
A2 64QAM
A2 256QAM
16 QAM out
64 QAM out
256 QAM out
Reg S"
Update of η's

EFFICIENT METHODS AND RECURSIVE/SCALABLE CIRCUIT ARCHITECTURES FOR QAM SYMBOL MEAN AND VARIANCE ESTIMATIONS

BACKGROUND

A technique used for digital information detection in so-called, Soft Interference Cancellation (SIC) receivers relies on iterative feedback of log likelihood ratio signals (LLR's) and progressively improved estimations of the more likely bit sequences to have been received through a noisy channel given a known constellation of the symbols representing those bit sequences. Within this technique, it is necessary to determine soft symbol means and variances of the constellation symbols. However, circuitry for generating the soft symbol means and variances tends to be large, complex and slow in performance.

SUMMARY

Circuits for producing signals representative of mean and variance estimation of quadrature amplitude modulation (QAM) symbols as used for example in SIC receivers are provided where the circuit comprises: sequentially repeated first circuit modules for producing iterative updates of Xi values ($\xi$'s) and/or Zeta values ($\zeta$'s) used in a corresponding estimation iteration; and sequentially repeated second circuit modules for producing iterative updates of Eta values ($\eta$'s) used in the corresponding estimation iteration.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1A:
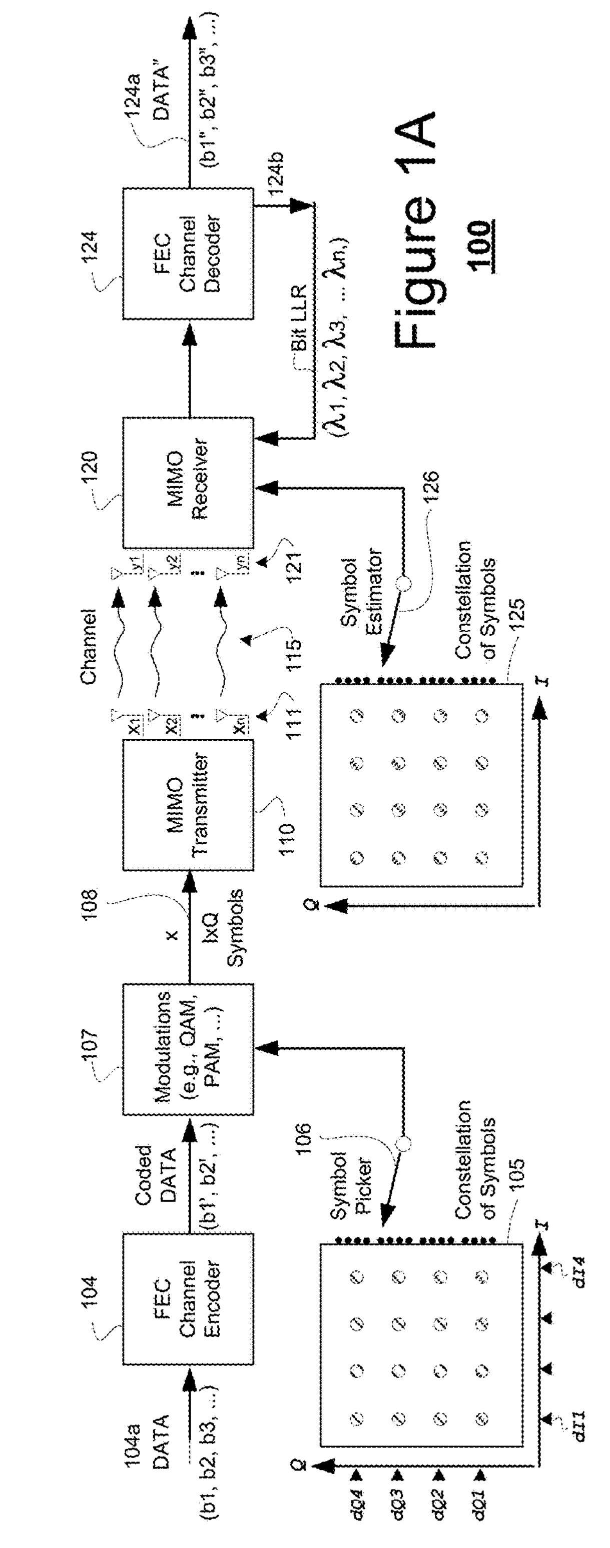
FIG. 1A is a schematic diagram of one embodiment of a multiple-input/multiple-output (MIMO) communication system using an iterative SIC receiver.

FIG. 1A is a block diagram illustrating an exemplary MIMO (multiple-input, multiple-output) communication system 100 having a multi-port to transmitter 110 (e.g., multi-antenna transmitter) and a multi-port receiver 120 (e.g., multi-antenna receiver) where the transmitter 110 is coupled to the receiver 120 by way of a communications channel 115 susceptible to noise and/or inter-symbol interference. The iterative SIC receiver relies on iterative updates of log-likelihood ratio signals (LLR's) to detect information bit sequences obtained from a constellation array of symbols where the detection determines the most likely of bit sequences to have been transmitted over a noisy channel having a certain signal to noise ratio (SNR).

Log-likelihood ratio signals (LLR's) provide a comparison between two model outcomes. Because it is based on a logarithm of the ratio of probabilities (likelihoods; e.g., L1/L2), if the two probabilities are the same, the log of their ratio is zero (Log(1)=0). If the numerator probability is greater, meaning the ratio is greater than one, the log of the ratio is positive. If the denominator probability is greater, meaning the ratio is less than one, the log is negative. Thus the sign of the result gives an indication of which model provides a better fit for given conditions and the absolute value gives an indication of degree that one model is better than the other. For the case where the competing models are that of a binary bit being zero or one, the LLR is the logarithm of the ratio of the probability of the bit being zero over the probability of the bit being one.

Still referring to FIG. 1A, a variety of techniques may be used for reconstructing at the receiver side, and output bitstream 124*a* whose represented symbols substantially match input symbols represented by an input bitstream 104*a* at the transmitter side. More specifically, in one embodiment the input bitstream 104*a* is passed through a forward error correction encoder (FEC) 104 and the coded data output is then applied to a signal modulator 107, wherein one embodiment multiple quadrature modulations are employed such as phase versus amplitude quadrature modulation (QAM) where orthogonal modulation schemes (denoted by the Q and I axes) are used to distinguish among discrete symbols within a predetermined constellation 105 of such symbols. Typically, the constellation is a square one where the maximum number of discrete positions (e.g., dQ1 through dQ4) along the Q axis match the maximum number of discrete positions (e.g., dI1 through dI4) along the I axis and the size of the constellation is typically denoted by a N' integer such as N'=4 representing the maximum number of discrete positions along just one of the orthogonal axes. In contrast to N', the non-italicized notation Q used herein is number of bits mapping to a N'-PAM symbol such that N'=2Q. In the schematic of FIG. 1A, the transformation of the coded data bits (e.g., b1', b2', . . . ) into orthogonally modulated output signals is represented by a symbol picker 106 which converts gray-coding or other coding of the input digital signals into corresponding discrete positions within the symbols constellation 105. Because the discrete positions within the symbols constellation 105 are spaced apart from one another by known distances in the complex space and the bit sequence associated with each axis is known and can be decoupled due to the squared QAM, it is possible to digitally model the likelihoods that certain bit sequences associated with the Q axis will go hand in hand with other bit sequences associated with the I axis.

The modulated signal X (108) is then applied to the multiple output transmitter 110 which in one embodiment has a plurality of spaced apart radio frequency antennas 111 from which there are emitted a corresponding plurality of spread spectrum signals X1 through Xn for transmission through the channel 115 and receipt by another plurality of spaced apart antennas 121 where the received signals are represented respectively by phase/amplitude vectors y1 through yn. The corresponding MIMO receiver 120 demodulates the received signals and passes them to an FEC decoder 124. A first output of the decoder represents the reconstructed data stream 124*a* (e.g., bit sequence b1", b2", b3", . . . ). A second output of the decoder provides a feedback 124*b* of log-likelihood ratio signals (LLR's) which are also represented here in by the Greek letter lambda (λ). In one embodiment, before final decisions are reached on the bits of the reconstructed data stream 124*a* (e.g., bit sequence b1", b2", b3", . . . ), a plurality of iterations are used in conjunction with the fed back LLR signals (e.g., $\lambda_1$, $\lambda_2$, $\lambda_3$, . . . ) so as to get a better estimation of what the reconstructed binary bits should be (either a "0" or a "1"). In FIG. 1A, a schematic of a symbol estimator 126 is used to represent how the plural iterations home in on a more likely discrete output decision within the predetermined constellation 125 of symbols. Such homing in may be separately carried out for the Q axis and for the I axis and then the combination of results determines the final symbol decision.

Figure 1B:
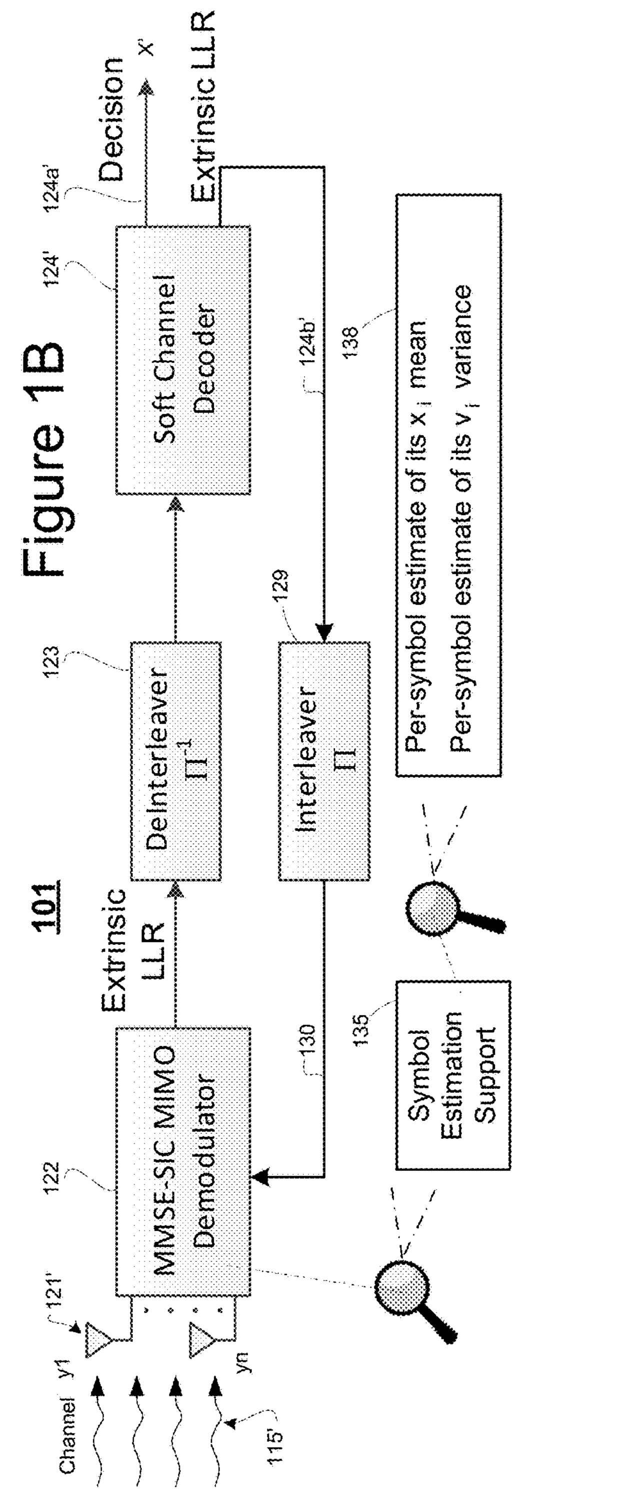
FIG. 1B is a schematic diagram showing a more detailed view of the iterative SIC receiver of FIG. 1A.

Referring to FIG. 1B, an exemplary embodiment 101 is schematically shown for the receiver side and more specifically for a symbol estimation portion of the receiver which relies on iterative determination of symbol mean and variance statistics. In the illustrated portion, received signals y1 through yn are provided by channel 115' to a corresponding array 121' of antennas where the latter couple to a corresponding SIC MIMO demodulator 122. The demodulator couples to an LLR de-interleaver 123 whose output signals are supplied to a soft channel decoder 124'. The decoder 124' has a first output 124*a*' from which the detected bit sequences are produced and a second output 124*b*' from which updated LLR signals are produced. The updated LLR signals are fed back and passed through interleaver 129 and returned (130) to the demodulator 122 for use in carrying out soft symbol estimation. The demodulator circuit 122 includes a soft symbol estimation support circuit 135. Within the support circuit 135 there are provided circuits 138 for performing per-symbol estimation of reconstructed output means ($\tilde{x}_i$) and per-symbol estimations of reconstructed output variances ($\tilde{v}_i^2$).

By way of explanatory mathematics, the process may be depicted by a receiver model:

$$y = Hx + n = \sum_{i=1}^{M_T} h_i x_i + n$$

where H is a channel transform determined by use of pilot signals and n represents a noise vector. Differences between the received signal vectors can be used to provide for soft interference cancellation:

$$\tilde{y}_i = h_i x_i + \sum_{j \neq i} h_j (x_j - \tilde{x}_j) + n$$

The original signal can be reconstructed at the receiver side with use of LMMSE filtering:

$$\breve{x}_i = \tilde{w}_i^\dagger \tilde{y}_i$$

$$\tilde{w}_i = \left(h_i h_i^\dagger + \sum_{j \neq i} \tilde{\sigma}_j^2 h_j h_j^\dagger + I\right)^{-1} h_i$$

where the cross symbol represents . . . . Within the process, the following mean and variance determinations are made:

$$\tilde{x}_i = E\{x_i\}$$

$$\tilde{\sigma}_j^2 = \mathrm{var}\{x_j - \tilde{x}_j\} = E\{|x_j|^2\} - |\tilde{x}_j|^2$$

Figure 1C:
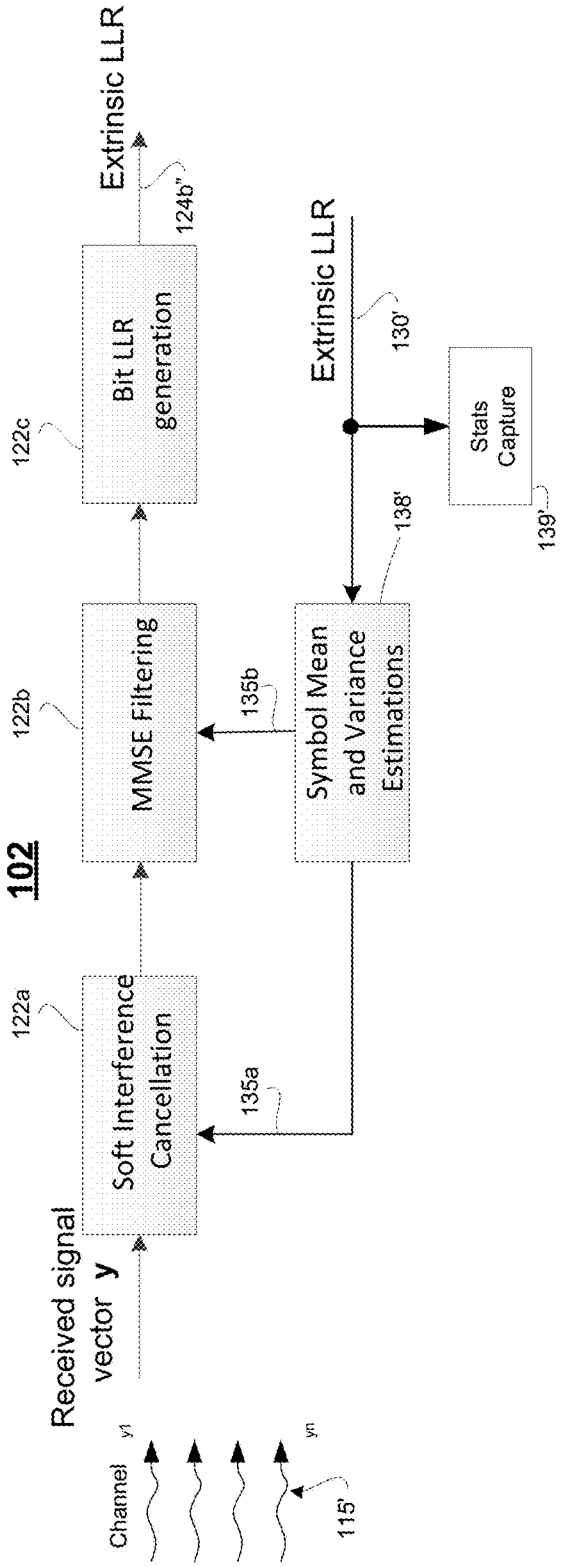
FIG. 1C is a schematic diagram showing in yet more detail the symbol estimation portion of FIGS. 1A and 1B.

Referring the next to FIG. 1C, shown is a more detailed embodiment 102 for the estimation support circuitry 138 of FIG. 1B for aforementioned processes. The estimation support circuitry includes a soft interference cancellation module 122*a*, a MMSE filtering module 122*b* and a bit LLR generating module 122*c* connected in sequence as shown. The fed back LLR signal 130' is supplied to a symbol mean and variance estimation circuit 138'. Outputs of the estimation circuit 138' are respectively fed back as signal 135*a* to the soft interference cancellation module 122*a* and as signal 135*b* to the MMSE filtering module 122*b*. Circuit size and complexity made disadvantageously increase as the size of the symbol mean and variance estimation circuit 138' increases, for example when the maximum number of discrete, per access points in a square constellation increases (e.g., from Q=3 to Q=4, 5 or higher). Also, in some designs it may be desirable to provide for different values of Q. However, because the values of the multiplicands for digital signal multipliers such as 316, 326 and 336 change with different values of Q, it may be necessary to provide for different sets of such circuits for each contemplated value of Q. Although not typically part of a receiver, FIG. 1C shows the option of a statistical capture unit 139' operatively coupled to the to the LLR feedback line 130' and configured to collect statistics about the distribution of LLR values as the circuit cycles through iterative updates. The collected statistics may be used to determine when various ranges of LLR values appear, for example along the x axis of below described FIG. 5A.

In one published paper (**), per single axis (e.g. Q or I) mean estimation has been proposed to be determined by use of a pipelined iteration process (Iteration 1):

- Initially set $\eta = 0$ and $\xi = 1$.
- For $i = 1 \ldots Q$, update $\xi$ and $\eta$ sequentially as $\xi \Leftarrow \xi \cdot \tanh\left(-\frac{\lambda_i}{2}\right)$, then $\eta \Leftarrow \eta + 2^{Q-i} \cdot \xi$.
- The PAM soft estimate is then obtained as $\tilde{x} = -\eta$ using the last update of $\eta$

** "Iterative MMSE-SIC Receiver with Low-Complexity Soft Symbol and Residual Interference Estimations" by Guosen Yue et al, (NEC Laboratories America, Inc., Princeton, N.J. 08540) IEEE Asilomar 2013, incorporated here by reference.

This first iteration process may be carried out by the circuitry 300 shown in FIG. 3 where the latter will be described in more detail below. Of importance, the circuitry 300 includes a plurality of first multipliers 316, 326 and 336 having progressively smaller multiplicands, x4, x2, x1 (for the case of Q=3) and thus calling for sequentially changing circuit design. These progressively smaller multiplicands correspond to the Xi (ξ) multiplying factor, $2^{Q-i}$ in the first proposed pipelined iteration process above where i steps from step 1 to step 3 in the case of Q=3. Also the circuitry 300 of FIG. 3 has only one output corresponding to the case of Q=3. Moreover, the tan h( ) function outputting blocks 312, 322, 332 of FIG. 3 each have a respective output of bit resolution r1 (for example r1=8 bits). When two of these outputs are digitally multiplied at full resolution, for example by general purpose multiplier 425, the output of that multiplication should have a bit resolution of r1+r1 (=r2 e.g., 16 bits). When three of these outputs are digitally multiplied at full resolution, for example by general purpose multiplier 435, the output of that multiplication should have a bit resolution of r2+r1 (=r3 e.g., 24 bits). Similarly, output resolution r4 of general purpose multiplier 445 in FIG. 4 would be r3+r1 (e.g., 32 bits). In one embodiment, the tan h( ) function outputting blocks 312, 322, 332 are implemented as general purpose lookup tables (LUT's) having the respective LLR values of predetermined bit resolution rii applied to their address input ports and having the respective tan h(λ) representing signal of bit resolution r1 produced by its data output port. It is within the contemplation of the present disclosure however to alternatively implement the tan h( ) function outputting blocks using other methods including those based on input value range determination and piece-wise linear estimation optionally improved with LUT based and/or interpolation based error correction. It is to be noted that the hyperbolic tangent function tan h(x) belongs to a class of hyperbolic functions that further include the hyperbolic sine function sin h(x), the hyperbolic cosine function cos h(x), and that there are counterpart inverse functions for these.

Figure 3:
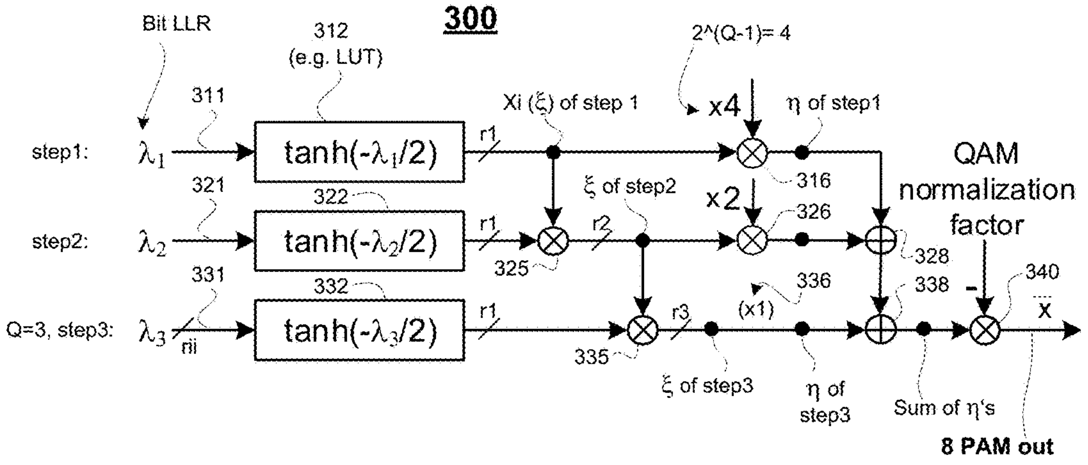
FIG. 3 is a schematic diagram of a mean determining circuit usable for a 8PAM constellation, that being one dimension of a 64 symbol QAM constellation, where the circuit employs a plurality of general purpose multipliers having different multiplicand values.

Next and still referring to FIG. 3, but with attention to details of its proposed iteration process, each successive step of the process depends on receiving results from the previous step. More specifically, general purpose digital multiplication circuit 325 requires settlement of the output signal (Xi of step 1) from a first tan h( ) function generating component 312 before that multiplication circuit 325 can produce its needed output signal (Xi of step 2). Similarly, general purpose multiplication circuit 335 has to wait for the output signal of multiplier 325 to settle before it can produce its needed output signal (Xi of step 3). Accordingly, digital summation circuit 338 has to wait for all previous multiplications (e.g., 325, 335) and previous additions (e.g., 328) to settle before it can output its result signal (a sum of Eta's). As seen, the latter sum is multiplied by a single normalization factor in general purpose multiplier 340 in order to produce a single axis mean result (X bar) for the case of Q=3 where the latter may also be referred to as an 8PAM output (because 2^Q=8 in this case). It is to be understood that the illustrated example of the tan h(λ) function blocks 312, 322, 332 being lookup tables (LUT's) each having a signed output resolution of r1 bits is merely one way of generating a signal representing the tan h( ) function output. in accordance with one aspect of the present disclosure, the tan h(λ) function blocks 312, 322, 332 may instead be implemented using piecewise linear or other approximation and using range detection for the input signals (λ). It is of course to be understood that in other embodiments, the approximating of tan h( ) to a less precise $2^{-K}$ value is performed after the tan h( ) function block produces a higher precision and accuracy result.

In accordance with the first proposed iteration process as carried out by the circuitry 300 of FIG. 3, each of the successive iterations steps (1, 2 and 3) has a respective bit LLR signal (lambda) applied by respective lines 311, 321 331 to respective hyperbolic tangent function generating block 312, 322 and 332. The outputs of the hyperbolic tangent function generating blocks are supplied to different multipliers 316, 325 and 335 where those respective multipliers then respectively drive next circuits, 328 and 338 (adders). Multipliers 325 and 335 are general purpose digital multipliers having different signed input and signed outputs of respective resolutions (e.g., rii, r1, r2, r3). Multipliers 316 and 326 can be implemented as leftward bit shifting circuits but with different shift amounts. A complex and nonsymmetrical arrangement of circuit components is therefore present in the embodiment 300 of FIG. 3.

Figure 2:
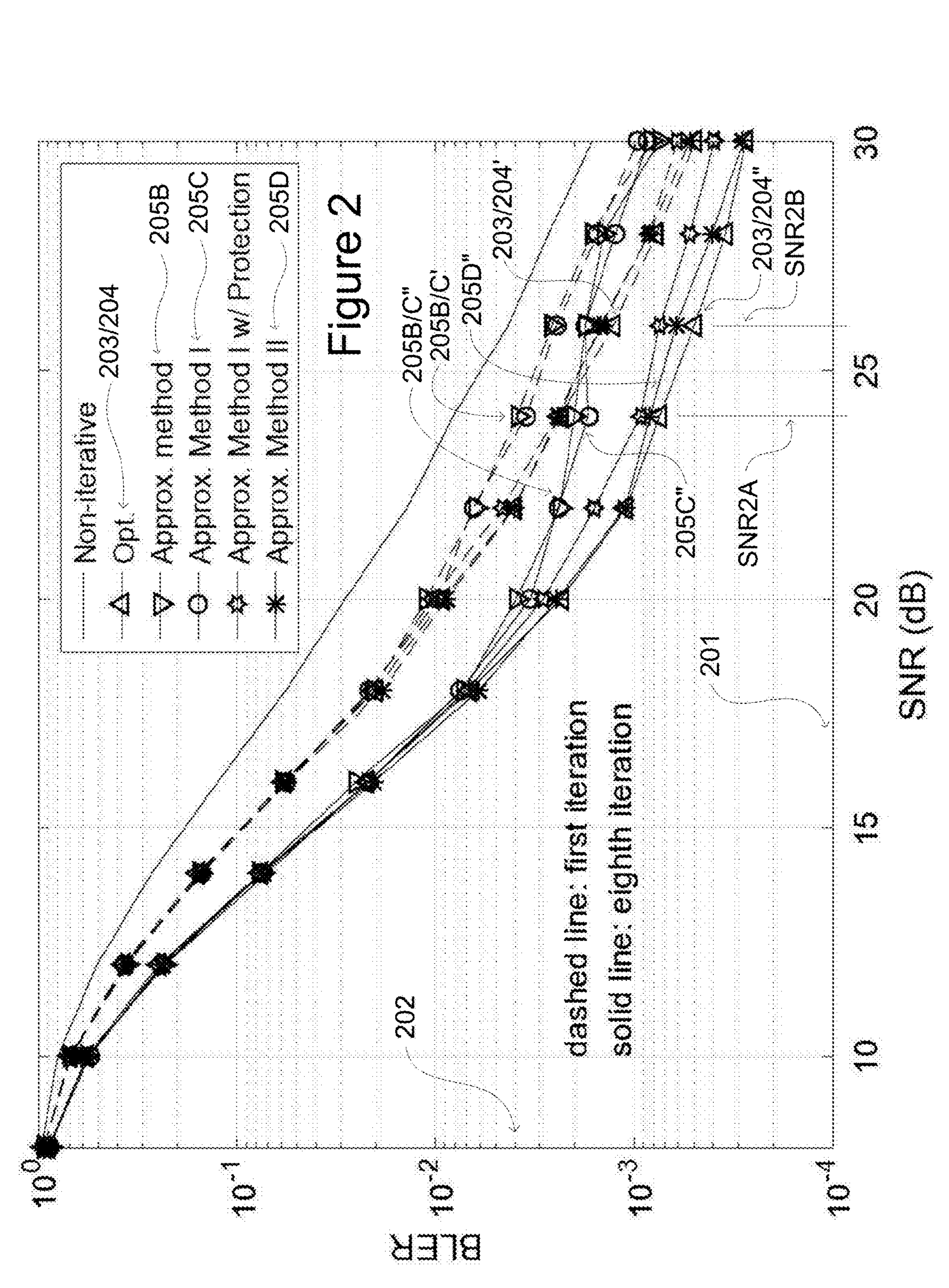
FIG. 2 is a plot of plural simulation runs for different designs of symbol estimation circuits.

Referring next to the plots of FIG. 2, shown are simulation results for different designs of mean and variance estimation circuits. The Y axis 202 in FIG. 2 represents block error rate (BLER) while the X axis 201 represents different signal-to-noise ratio (SNR) environments for the simulated channel. It will be shown that general purpose multiplier circuits of relatively complex design and relatively large circuit sizes can be replaced by special purpose multiplier circuits of relatively simpler design and relatively smaller circuit sizes while obtaining substantially similar BLER versus SNR performance.

Figure 4:
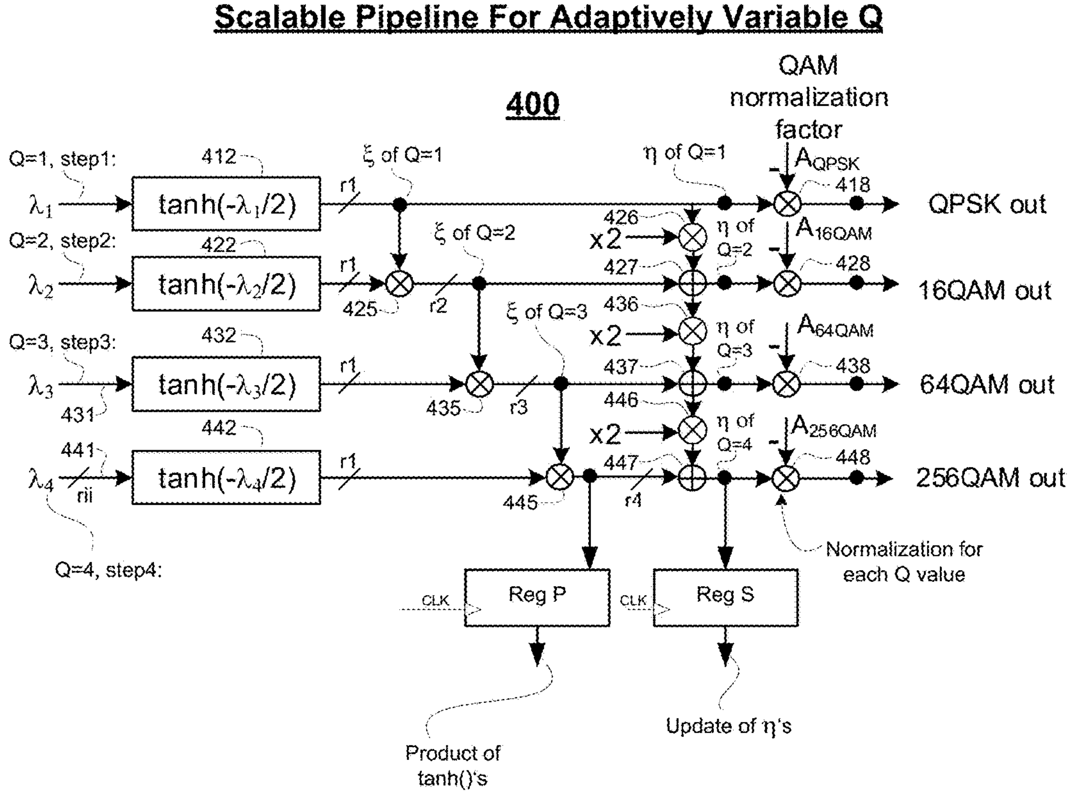
FIG. 4 is a schematic diagram of a first mean determining circuit in accordance with an embodiment having plural QAM constellation outputs.

In FIG. 2, the apex up triangle symbol 203/204 is used for the simulation results obtained for the respective circuitry 300 of FIG. 3 and for respective circuitry 400 of FIG. 4. In other words, both of those circuits had same BLER versus SNR performance results and, as seen from the apex up triangle symbol plots in FIG. 2 those performances were the best (lowest BLER values) in their respective classes. The dashed plot 203/204' represents the results of a single iteration run while the solid line plot 203/204" represents the results of a turbo 8 iteration run for respective ones of the simulated SNR environments. As can be seen for the SNR case SNR2A, just below 25 dB, the turbo 8 iteration run 203/204" for that SNR2A case has a lower BLER (lower error rate) than the single iteration run 203/204'. Thus improvement in error cancellation (lower BLER) is seen when more iterations are run. Because the circuitry of FIG. 3 uses full resolution general purpose multipliers such as 325 and 335, the results are near to theoretical ideals (also referred to herein as optimal mean estimations). However, as recognized above, the circuitry is relatively complex and non-repeating. It will be shown below that simpler circuitry is possible having a repeating structure for generating same results of BLER values (in respective SNR environments) but which can be used for different QAM modulations. It will be also shown below that simpler circuitry having a repeating structure can be used to generate approximated results with BLER values not far off from the theoretical ideals when the channel SNR is below about 20 dB (the plots converge). Plot 205B corresponds to an approximating circuit 502 shown in FIG. 5B. Plot 205C corresponds to an approximating circuit 503 shown in FIG. 5C. Plot 205D corresponds to an approximating circuit 504 shown in FIG. 5D.

Before examining the details of FIG. 4, a corresponding and second iteration process (Iteration 2) is presented immediately below where the calculation for each successive value of Eta (η) is provided as a simple left shift (by one bit place) of the previous value of Eta (η) and an addition of the current value of Xi (ξ). This results in a repetitive circuit structure as will next be described.

- Initially set η = 0 and ξ = 1.
  - For i = 1 . . . , Q, update ξ and η sequentially as $$\xi \Leftarrow \xi \cdot \tanh\left(-\frac{\lambda_i}{2}\right), \text{ then } \eta \Leftarrow 2\eta + \xi.$$

- The PAM soft estimate is then obtained as $\tilde{x} = -\eta$ using the last update of η.

Referring to FIG. 4, the illustrated embodiment 400 is a pipeline circuit that has plural tapped outputs, QPSK_out, (4×4)QAM_out, (8×8)QAM_out, and (16×16)QAM_out for the respective cases where the maximum dimension of the respective square constellation of symbols is correspondingly, Q=1, Q=2, Q=3 and Q=4 of each of the I, Q dimensions of the corresponding quadrature scheme. Although not shown the series can be continued to cover the cases of Q=5, Q=6 and so on. Other than the Q specific normalization factor, the circuit 400 utilizes a repeated design that produces a product of tan h( ) outputs and a sum based on left shifted Eta's (η's). More specifically, each update of η is the sum of the left shifted η of the previous step (corresponding to the 2η factor in the above Iteration2 process) summed with the products of tan h( ) results obtained in a current step.

Figure 5A:
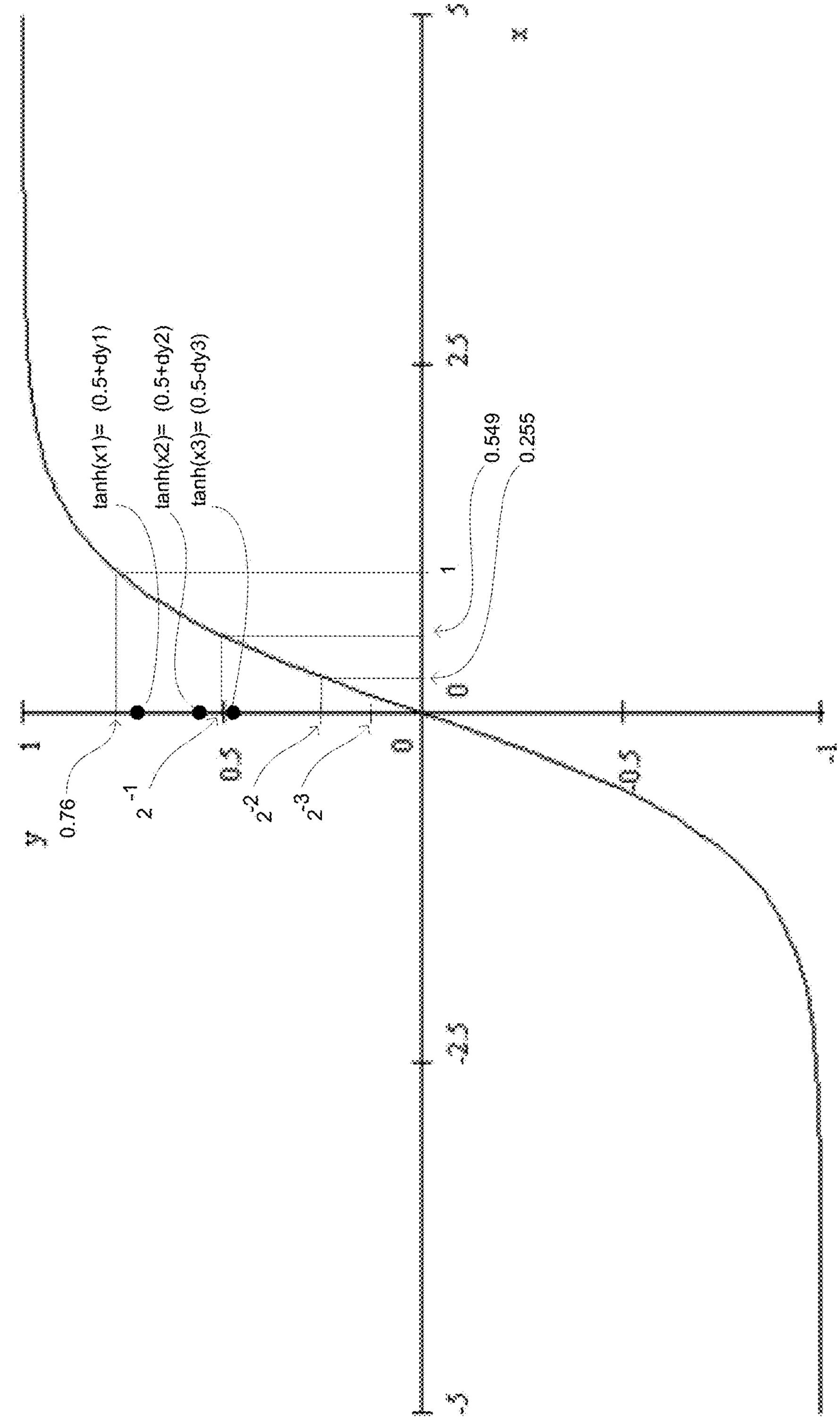
FIG. 5A is a plot of the tan h(x) function with explanatory pointers added to it.

More specifically, it is recognized in FIG. 4 that each of the successive steps of the above described, Iteration 2 can define a respective horizontal row for a corresponding Q in which, for the case of Q1 and step 1, the corresponding Xi values (ξ's) can be generated by applying the corresponding Bit LLR's ((λ1's) to a first tan h(x) generating circuit block 412 programmed or otherwise configured to produce a corresponding tan h(−λ/2) signal for the respective input signals. It is to be appreciated that the tan h( ) function has a range 1.0≥tan h(x)≥−1.0 (and yet more practically as shown in FIG. 5A narrower than that when the inputs are LLR values so that it can be implemented with a LUT and/or by way of other designs including piecewise approximation designs) and the output signal of the first circuit block 412 therefore represents a floating point or fixed point digital value in that range where precision and accuracy are determined by consideration of design goals and available circuit space on a corresponding monolithically integrated circuit (not shown). The Eta values (η's) for the case of Q1 and step 1 are simply 1 times the corresponding Xi values (ξ's) and thus simple wire provides those to a normalizing, general purpose multiplier 418 which receives as another multiplicand input the negatively signed $A_{QPSK}$ signal and produces the corresponding QPSK_out signal for optional use when pulsed amplitude modulation is used.

For the case of Q2 and step 2, the corresponding Xi values (ξ's) can be generated by applying the corresponding Bit LLR's ((λ2's) to a second tan h( ) generating circuit block 422 configured to produce a corresponding tan h(−λ/2) signal for the respective input signals where the latter signals are applied as first multiplicands to a general purpose second digital multiplier 425 while the Xi values (ξ's) of step 1 are applied as second multiplicands to the same general purpose digital multiplier 425. The outputs of the second digital multiplier 425 are supplied to a first digital adder 427. A second input of the first digital adder 427 receives a left shifted (by one bit) and zero padded version of the Eta values (η's) of step 1 to thereby form the Eta values (η's) for the case of Q2 and step 2. Although a multiply by 2 symbol is shown at 426, it is to be understood that this function is can be performed with a minimized circuit that simply shifts its received bits by one bit place and inserts a padding zero bit at the least significant bit location (LSB) of its output. A general purpose, normalizing multiplier 428 receives the Eta values (η's) for the case of Q2 and step 2 as first multiplicand inputs and receives as another multiplicand input the negatively signed $A_{16QAM}$ signal and produces the corresponding 16QAM_out signal for optional use when 4×4 quadrature amplitude modulation is used.

It is to be noted that when the Eta values (η's) of step 1 are multiplied by 2 (e.g., by shift circuit 426) and thereafter supplied into the addition performed by adder circuit 427, the significance of that x2 addend becomes relatively more important to the addition result and conversely, the significance of the next addend in the chain (e.g., the one obtained from multiplier 425) becomes relatively less important to the addition result. Moreover, the products of multipliers 425, 435, 445, etc. are those of multiplying by values all less than one so that as the chain of multiplications continues, the absolute values of the products keep shrinking.

Similarly, for the case of Q3 and step 3, the corresponding Xi values (ξ's) can be generated by applying the corresponding Bit LLR's ((λ3's) to a third tan h( ) generating circuit block 432 configured to produce a corresponding tan h(−λ/2) signal for the respective input signals where the latter signals are applied as first multiplicands to a general purpose third digital multiplier 435 while the Xi values (ξ's) of step 2 are applied as second multiplicands to the same digital multiplier 435. The outputs of the second digital multiplier 435 are supplied to a second digital adder 437. A second input of the second digital adder 437 receives a left shifted (by one bit) and zero padded version of the Eta values (η's) of step 2 to thereby form the Eta values (η's) for the case of Q3 and step 3. Once again, although a multiply by 2 symbol is shown at 436, it is to be understood that this function can be performed with a minimized circuit that simply shifts its received bits by one bit place left and inserts a padding zero bit at the least significant bit location (LSB) of its output. A general purpose, normalizing multiplier 438 receives the Eta values (η's) for the case of Q3 and step 3 as first multiplicand inputs and receives as another multiplicand input the negatively signed $A_{64QAM}$ signal and produces the corresponding 64QAM_out signal for optional use when 8×8 quadrature amplitude modulation is used.

Moreover, and yet again in repeating circuit structure fashion, for the case of Q4 and step 4, the corresponding Xi values (ξ's) can be generated by applying the corresponding Bit LLR's (λ4's) to a third tan h( ) generating circuit block 442 configured to produce a corresponding tan h(−λ/2) signal for the respective input signals where the latter signals are applied as first multiplicands to a general purpose, fourth digital multiplier 445 while the already produced Xi values (ξ's) of step 3 are applied as second multiplicands to the same general purpose digital multiplier 445. The outputs of the third digital multiplier 445 are supplied to a third digital adder 447. A second input of the third digital adder 447 receives a left shifted (by one bit) and zero padded version of the already produced Eta values (η's) of step 3 to thereby form the Eta values (η's) for the case of Q4 and step 4. Once again, although a multiply by 2 symbol is shown at 446, it is to be understood that this function is can be performed with a minimized circuit that simply shifts its received bits by one bit place left and inserts a padding zero bit at the least significant bit location (LSB) of its output. A general purpose, normalizing multiplier 448 receives the Eta values (η's) for the case of Q4 and step 4 as first multiplicand inputs and receives as another multiplicand input the negatively signed $A_{256QAM}$ signal and produces the corresponding 256QAM_out signal for optional use when 16×16 quadrature amplitude modulation is used.

Although most of the circuitry 400 of FIG. 4 is illustrated as a linear cascade of repeated components, connected as an asynchronous ripple down and ripple across circuit (no intervening, data capturing clocked registers), it is within the contemplation of the present disclosure to at least partially implement it as a registered and at least partially synchronous circuit by inserting clocked data registers at appropriate spots. For example, a first set of clocked data registers (not shown) could be respectively placed at the output nodes, QPSK_out, (4×4)QAM_out, (8×8)QAM_out, and (16×16) QAM_out for buffering settled result signals. A second set of clocked data registers, for example Reg_P and Reg_S can be respectively placed as the nodes where products of tan h( ) values are present and where sums of shifted Eta's (η's) and product of tan h( ) are present for buffering settled result signals present at those nodes at appropriately clocked time points.

Moreover, although the circuitry 400 of FIG. 4 is illustrated as a linear cascade of repeated components, connected as an asynchronous ripple down and ripple across circuit, it is within the contemplation of the present disclosure to at least partially implement it as a registered cyclical pipeline structure (e.g., similar to how circular memory buffers are formed) where same tan h( ) generating circuit blocks can be implemented with for example lookup tables (LUT's) and/or piecewise estimator circuits such as 422 are re-used while receiving higher ordinated lambda signals (e.g., λ5's, λ6's, etc.) for higher order QAM symbols and same multipliers such as 425 are re-used while receiving the tan h outputs for the higher ordinated lambda signals and shifter/adder combinations like 426 and 427 are re-used while receiving the higher ordinated products of Xi values (ξ's) as one input and the Eta values (η's) of the preceding step as second inputs. The corresponding normalizing multipliers like 428 of the reused circuit portions are understood to similarly receive at synchronized times the corresponding normalizing factors.

Comparing circuit 300 of FIG. 3 with circuit 400 of FIG. 4 it may be seen that the circuitry of FIG. 4 is more readily adaptable for implementation (when appropriately registered) as a circularly re-usable components because each of the second through N'th rows (only rows 1-4 shown) has the same left shift by 1 bit place component like 426 followed by an adder like 427. Moreover, the circuitry of FIG. 4 is more readily adaptable for implementation in an adaptive receiver which is configurable to handle different forms of symbol constellations including for example 4×4, 8×8 and 16×16 due to the multiple output taps provided in FIG. 4. Thus single circuit such as 400 of FIG. 4 can be used to service any one of different constellation/modulation schemes including that of 4×4 (Q=2), 8×8 (Q=3), 16×16 (Q=4) and so forth.

The simulated block error processing results of FIG. 2 demonstrate that by way of plots 203/204' and 203/204" that the structure of FIG. 4 can perform exactly the same as that (300) of FIG. 3 for each of the simulated SNR environments where 203/204' and 203/204" are not only the corresponding BLER plots for the case of FIG. 3 but also for the case of FIG. 4.

Figure 5B:
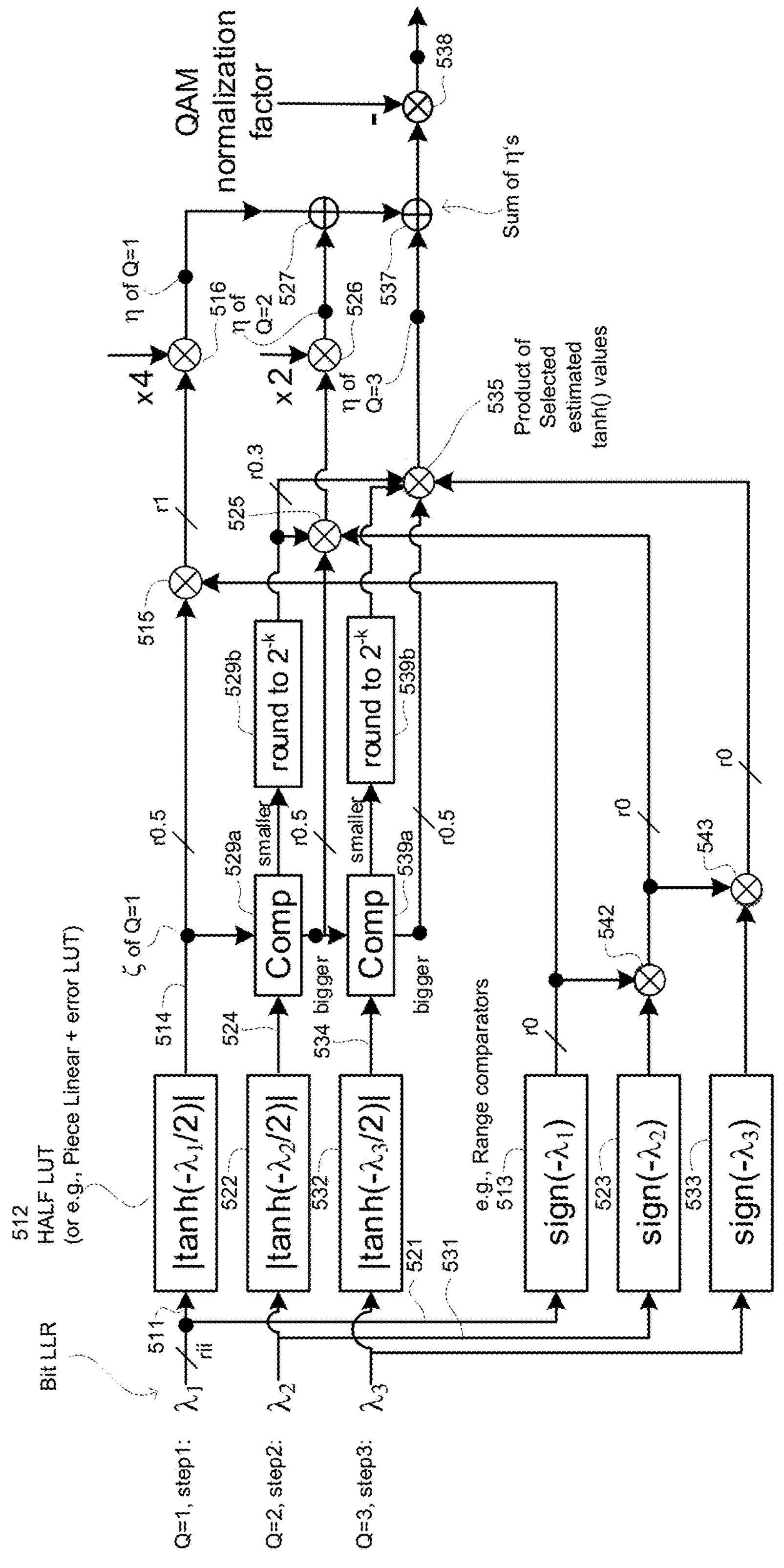
FIG. 5B is a schematic diagram of a second mean determining circuit having a QAM constellation estimation output and employing absolute value of tan h( ) function generating circuits.

Referring to FIG. 5B, shown is a circuit 502 which eliminates the general purpose multipliers for the tan(h) signals (e.g., 425, 435, 445 of FIG. 4); which uses smaller tan h( ) generating blocks 512, 522 and 532 (for example half sized LUT's) in place of the signed full ones 412, 422, 432 of FIG. 4 and which provides accompanying sign selection by way of sign detectors 513, 523 and 533 in combination with sign multipliers 541, 542 and 543. While in one embodiment the sign detectors 513, 523 and 533 could themselves be lookup tables (LUT's), it is within the contemplation of the present disclosure for the sign detectors 513, 523 and 533 to be or to include input range detectors such as comparators which automatically determine whether the respective input signal (Xi) is within a predetermined range (e.g., $\lambda_0<\lambda_i<\lambda_5$ or $0\leq\lambda_i$). The advantage of eliminating the general purpose multipliers and of using the smaller tan h( ) generating blocks 512, 522 and 532 is that the circuitry becomes smaller, simpler and faster in performance speed. More specifically, for the absolute value producing tan h( ) generating blocks 512, 522 and 532 (e.g., smaller lookup tables), their internal data addressing and/or data comparing circuitries can be smaller and faster than those of comparative full sized, signed output tan h( ) generating blocks. The output bit resolutions for the unsigned tan h( ) generating blocks 512, 522 and 532 are denoted as r0.5 to indicate they are 1 bit shorter than those of the full sized signed tan h( ) generating blocks (e.g., 412, 422 and 432) and to indicate that the circuit sizes of the respective unsigned tan h( ) generating blocks can be 50% smaller. A disadvantage however of using the unsigned tan h( ) generating blocks 512, 522 and 532 is that the binary representations of negative signals are not merely the inverse of counterpart positive representing digital signals and selectively different processing needs to be provided as between possible picks for positive and negative values. Thus sign indicating blocks 513, 523 and 533 are provided with respective one bit wide outputs (resolution r0) to indicate the appropriate polarity and multipliers 515, 525, 535 are provided with functionality for performing binary value polarity reversal as needed. (Typically, polarity inversion for binary numbers involves flipping a sign bit, flipping the value bits and adding an offset such as one; e.g., +0001 in base 2 becomes −1111.)

One method for approximating or rounding |tan h( )| to a corresponding $2^{-k}$ value is explained as follows. For values of index i $|\tan h(-\lambda_i/2)|$, denoted as $|\varphi_i|$, since $|\varphi_i|\leq 1$, it can be represented in hardware (or quantized with the fixed point representation) by $\Sigma_k a_{i,k}2^{-k}$, $a_{i,k}\in\{0,1\}$. Then for a $|\varphi_i|$, in the production, one can first find the first non-zero bit, $a_{i,k'_i}\neq 0$, i.e., $a_{i,k}=0$ for $k<k_i'$. One can then check the next following bit, i.e., $a_{i,k'_i+1}$. One can then approximate $|\varphi_j|$ by $2^{-k'_i}$ if $a_{i,k'_i+1}=0$ or $|\varphi_j|\approx 2^{-k'_i}$ if $a_{i,k'_i+1}=1$. This means that one has rounded $|\varphi_j|$ to the closest $2^{-k}$. So any value $|\varphi_i|\leq 1$, can be approximated to a closest $2^{-k}$. That said, it is important to determine which values of $|\tan h(-\lambda_i/2)|$ output can be so rounded without creating excessive error. In other words, by determining the i* among $|\tan h(-\lambda_i/2)|$ values and deciding to keep its precision and value it is possible to approximate one or more other $|\tan h(-\lambda_i/2)|$ values to their respective $2^{-k}$; values without introducing significant error to the produced mean result.

The circuitry 502 of FIG. 5B is an exemplary implementation for determining the i* of the maximum |tan h( )| among $|\tan h(-\lambda_i/2)|$ values in a production and deciding to keep its precision and value, approximate other $|\tan h(-\lambda_i/$ 2)| values in the production to their respective $2^{-k}$; values without introducing significant error to the produced mean result. In the circuitry 502 of FIG. 5B, the tan h($-\lambda_1/2$) output signal on line 514 is directly coupled without possibility of substitution to polarity reversal unit 515 where the 1 bit polarity control signal thereof is obtained from signage indicating unit 513. On the other hand, for the case of the tan h($-\lambda_2/2$) output signal on line 524, a first comparator/selector 529*a* is provided and configured to determine which of unsigned tan h( ) signals 514 and 524 is the bigger one and which is the smaller one and to route the smaller one to rounding circuit 529*b* (a $2^{-k}$ value substituting unit) while routing the bigger one to next comparator/selector 539*a*. Rounding circuit 529*b* rounds the result to a base 2 valuation in the range 0.00 to 1.00 and supplies the rounded (approximated) digital result signal to special purpose multipliers 525 and 535.

The second comparator/selector 539*a* is provided and configured to determine which of unsigned tan h signals 534 and the one supplied from 529*a* is the bigger one and which is the smaller one and to route the smaller one to rounding circuit 539*b* while routing the bigger one to special purpose multiplier 535. Rounding circuit 539*b* rounds its received result to a base 2 valuation in the range 0.00 to 1.00 and supplies the rounded (approximated) digital result signal to one input of multiplier 535. Multiplier 535 also receives a sign specifier from special purpose multiplier 543. Multiplier 525 similarly receives a sign specifier from multiplier 542. Multiplier 515 receives its sign specifier from sign detector 513. Multiplier 535 is deemed a special purpose multiplier because only one of its inputs is a general purpose multiplicand input (the r0.5 resolution signal from comparator/selector 539*a*). Two further inputs of the special purpose multiplier 535 receive respective integer k values from respective rounder identifying units 539*b* and 529*b* where the respective integer k values (e.g., k=1, 2 or 3) indicate how many bit places to the right the general purpose multiplicand will be shifted with insertion of zero bits at the emptied spots. A fourth input signal of the special purpose multiplier 535 is the polarity reversal indicating one (obtained from multiplier 543 as mentioned above). After the respective right bit place shifts are performed on the received general purpose multiplicand signal (of initial resolution r0.5 bits) its polarity is selectively flipped or not based on the polarity reversal indicating signal. Thus no general purpose multiplication occurs in special purpose multiplier 535. Just rightward bit shifting and optional polarity reversal is performed. Accordingly, special purpose multiplier 535 can be implemented as smaller and faster circuitry than a general purpose multiplier.

Similarly for the case of multiplier 525, it is deemed a special purpose multiplier because only one of its inputs is a general purpose multiplicand input (the r0.5 resolution signal from comparator/selector 529*a*). A further input of the special purpose multiplier 525 receives a respective integer k value from respective rounder identifying units 529*b* where the respective integer k value (e.g., k=1, 2 or 3) indicates how many bit places to the right the general purpose multiplicand will be shifted with insertion of zero bits at the emptied spots. A third input signal of the special purpose multiplier 525 is the polarity reversal indicating one (obtained from multiplier 542 as mentioned above). Thus no general purpose multiplication occurs in special purpose multiplier 525. Just rightward bit shifting and optional polarity reversal is performed. Accordingly, special purpose multiplier 525 can be implemented as smaller and faster circuitry than a general purpose multiplier.

Multiplier 516 multiplies the output of multiplier 515 by 4 (e.g., using a left shift factor of 2 bit places) to produce the Eta value ($\eta$) for the case of Q=1 and step 1. Multiplier 526 multiplies the output of multiplier 525 by 2 (e.g., using a left shift factor of 1 bit place) to produce the Eta value ($\eta$) for the case of Q=2 and step 2. Multiplier 535 directly produces the Eta value ($\eta$) for the case of Q=3 and step 3. Respective sums of Eta values ($\eta$'s) are produced by digital adders 527 and 537 for the respective cases of Q=2 and Q=3. Multiplier 538 normalizes the result for the case of Q=3.

Continuing with reference to the tan h(x) function graph 501 of FIG. 5A, it may be noted that the tan h(x) function is mirror symmetrical about the x axis. Additionally, for absolute values of x less than 1, the tan h(x) function is relatively linear. Also for absolute values of x greater than 2.5, the tan h(x) function is relatively linear (asymptotically approaching 1). Thus the tan h(x) function can be broken up into piecewise approximating lines or curves where input range detection (not shown, but for example digital comparators configured to determine if $\lambda_0<\lambda_i<\lambda_5$ is true where $\lambda_0$ and $\lambda_5$ are predetermined breakpoints) is used to determine what approximating line/curve is to be used and optionally what error correcting LUT and/or other result improving means (e.g., interpolation) is to be used. The input range detection circuitry (not shown) may be optionally used to determine if substitution with a $2^{-k}$ value is practical for a desired mean estimation accuracy.

More specifically, given three values on the plot, say tan h(x1), tan h(x2) and tan h(x3), and assuming |tan h(x1)|>|tan h(x2)|, the system automatically picks the |tan h(x2)| output as the one that will undergo approximation. Then, the system compares the larger one of |tan h(x1)| and |tan h(x2)|, which is now |tan h(x1)| based on the assumption, with |tan h(x3)|, the system may pick the smaller one of |tan h(x1)| and |tan h(x3)| outputs as the ones that will undergo approximation by rounding it to the closest largest $2^{-k}{}_2$, and finally after two comparisons, the largest one of |tan h(x1)|, |tan h(x2)|, |tan h(x3)| is selected as the one that will not undergo approximation.

More specifically, in the case of FIG. 5B, the respective comparator and rounder circuit pairs, 529*a*/529*b* and 539*a*/539*b* determine which of the tan h(x) values are to be substituted for by respective ($2^{-k}$) values. Then, because the picked out ($2^{-k}$) values are known to be definitions of binary shift right amounts, the circuits of multipliers 525 and 535 can be simplified to operate as binary shifting ones further modified to also provide a polarity reversal function when needed. Thus the larger and more complex general purpose multipliers are eliminated.

It is to be noted that the outputs of the rounder circuits, 529*b* and 539*b*, are of lower bit resolution than the resolutions r0.5 of the half sized LUT's. This smaller resolution is denoted in FIG. 5B by r0.3. The r0.3 resolution signals are fed to multipliers 525 and 535 where the smaller bit resolutions r0.3 of these allow the corresponding multipliers 525 and 535 to be made smaller. In one embodiment, the rounder circuits, 529*b* and 539*b* generate respective codes for their respective values of k. For example, a bit code may be used to represent four different values of k (e.g., 00 means k=1, 01 means k=2, 10 means k=3, and 11 means k=4). Respective multiplexers (not shown) in the special purpose multipliers 525, 535 receive these codes and shift the r0.5 multiplicand accordingly.

Figure 5C:
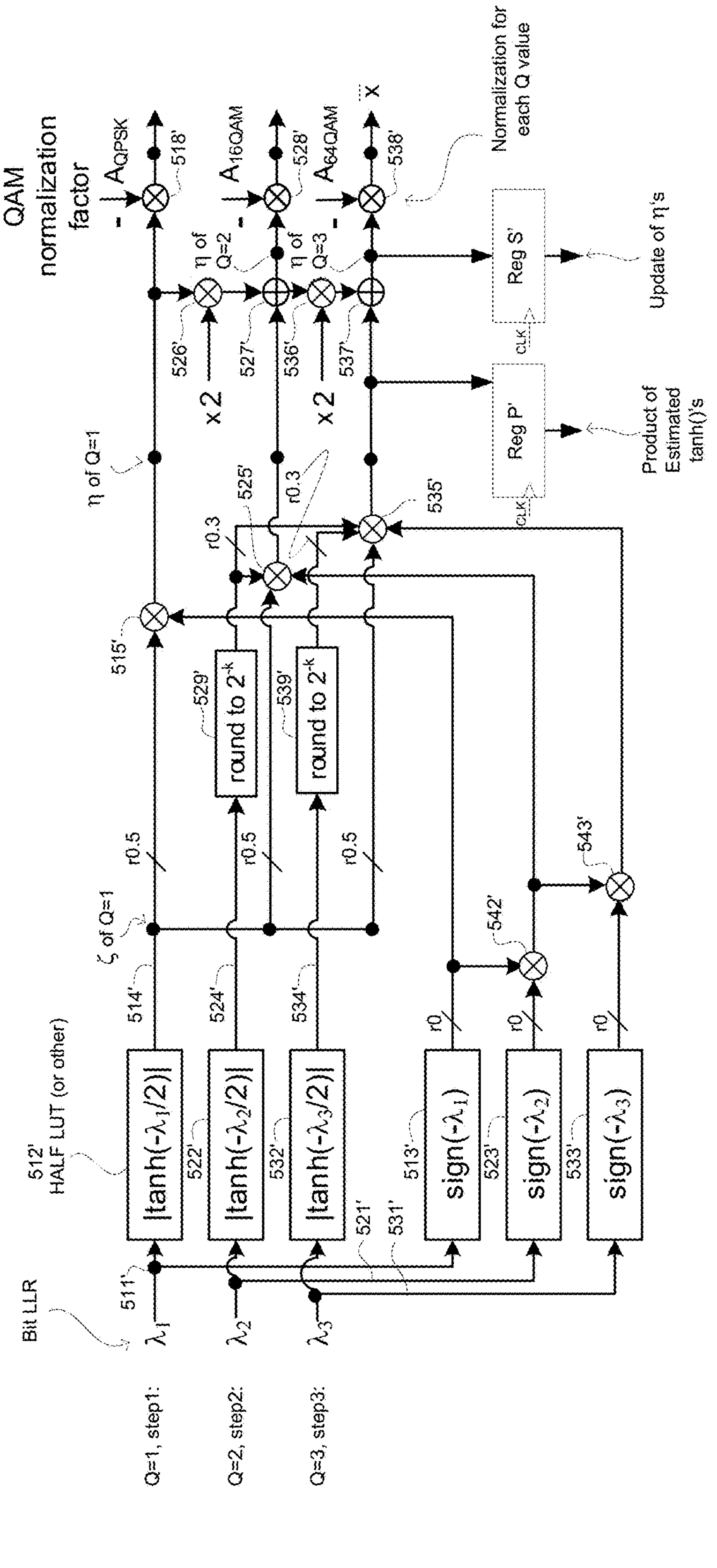
FIG. 5C is a schematic diagram of a third mean determining circuit embodiment.

Referring to FIG. 5C, an alternative option determines for the cases of i=1, 2, 3, etc., which of the |tan h($-\lambda_1/2$)|, |tan h($-\lambda_2/2$)|, |tan h($-\lambda_3/2$)|, etc. to keep as not approximated and which to round to a respective $2^{-k}$ value. More specifically, in the exemplary case of FIG. 5C it has been determined to always keep as not approximated, |tan h(−λ$_1$/2) value and to always round to a respective $2^{-k}$ value, the |tan h(−λ$_2$/2)| and |tan h(−λ$_3$/2)| values. Other permutations are of course within the contemplation of the present disclosure. Additionally, it is within the contemplation of the present disclosure to adaptively change from time to time the decision as to which of the |tan h(−λ$_1$/2)|, |tan h(−λ$_2$/2)|, |tan h(−λ$_3$/2)|, etc. to keep as not approximated and which to round to a respective $2^{-k}$ value based on heuristically developed algorithms. An advantage of picking among the cases of i=1, 2, 3, etc., which to keep (to keep its |tan h(−λ$_i$/2)| value) as not approximated and which to round (to round its |tan h(−λ$_i$/2)| value) to a respective $2^{-k}$ value is that the comparators are eliminated. In other words, further simplification and size reduction is provided by circuit 503 in which the comparators 529*a*, 539*a* of FIG. 5B are eliminated. One reason for making the choices among the cases of i=1, 2, 3, etc., for FIG. 5C is based on the observed QAM mapping rules where bit $b_1$ is the most significant bit in the QAM mapping among {$b_1$ $b_2$ $b_3$} in the products of |tan h(−λ$_2$/2)|*|tan h(−λ$_2$/2)| and |tan h(−λ$_1$/2)|*|tan h(−λ$_2$/2)|*|tan h(−λ$_3$/2)|, and thus it contributes most to significance. On the other hand, bits b2 and b3 are less significant in the products and thus approximation can be used for the corresponding |tan h(−λ$_2$/2)| and |tan h(−λ$_3$/2)| values. As another example not shown in FIG. 5C, for the product of |tan h(−λ$_2$/2)|*|tan h(−λ$_3$/2)|*|tan h(−λ$_4$/2)|, |tan h(−λ$_2$/2)| is the one that will not undergo approximation, but |tan h(−λ$_2$/2)| and |tan h(−λ$_2$/2)| will undergo approximation, because $b_2$ is the most significant bit in the QAM mapping among {$b_2$ $b_3$ $b_4$} in the product. Thus in the example of FIG. 5C, the same |tan h(−λ$_1$/2)| value is applied as the r0.5 multiplicand to each of the special purpose multipliers 515', 525' and 535' while the respective $2^{-k}$ values (or the corresponding k codes) are further applied to special purpose multipliers 525' and 535'. Also the differently valued shift multipliers 516 and 526 are replaced by repetitive ones 526' and 536' in FIG. 5C. To avoid unnecessary repetition, primed reference numbers (e.g., 511') are used in FIG. 5C for correspondingly numbered components in FIG. 5B. As seen in FIG. 5C, the comparison/selection circuit modules have been deleted and the Q=1 signal on line 514' is directly fed to bit shifting and polarity adjusting digital multipliers 525' and 535'. Additionally, recursively repeatable circuit sections such as binary left shifter 526' and binary adder 527' are used for producing the sum of shifted Eta's (η's) signals which can be stored in pipelining registers such as the illustrated Reg S'. Similarly the products of the binary rounded tan h( ) values can be stored in pipelining registers such as the illustrated Reg P'. Normalization of the outputs for the cases of Q=1 (PSK), Q=2 (4×4QAM) and Q=3 (8×8QAM) are provided by respective multipliers 518', 528' and 538'. It is to be understood that the repeating pattern can be extended for larger constellation values such as Q=4 (16×16QAM), Q=5 (32×32QAM) and so on. Additionally pipelining registers similar to the illustrated Reg P' and the illustrated Reg S' ones can be provided elsewhere in the circuit rather than using asynchronous ripple down and ripple across techniques. Result capturing registers can further be provided at the mean estimating output nodes.

Figure 5D:
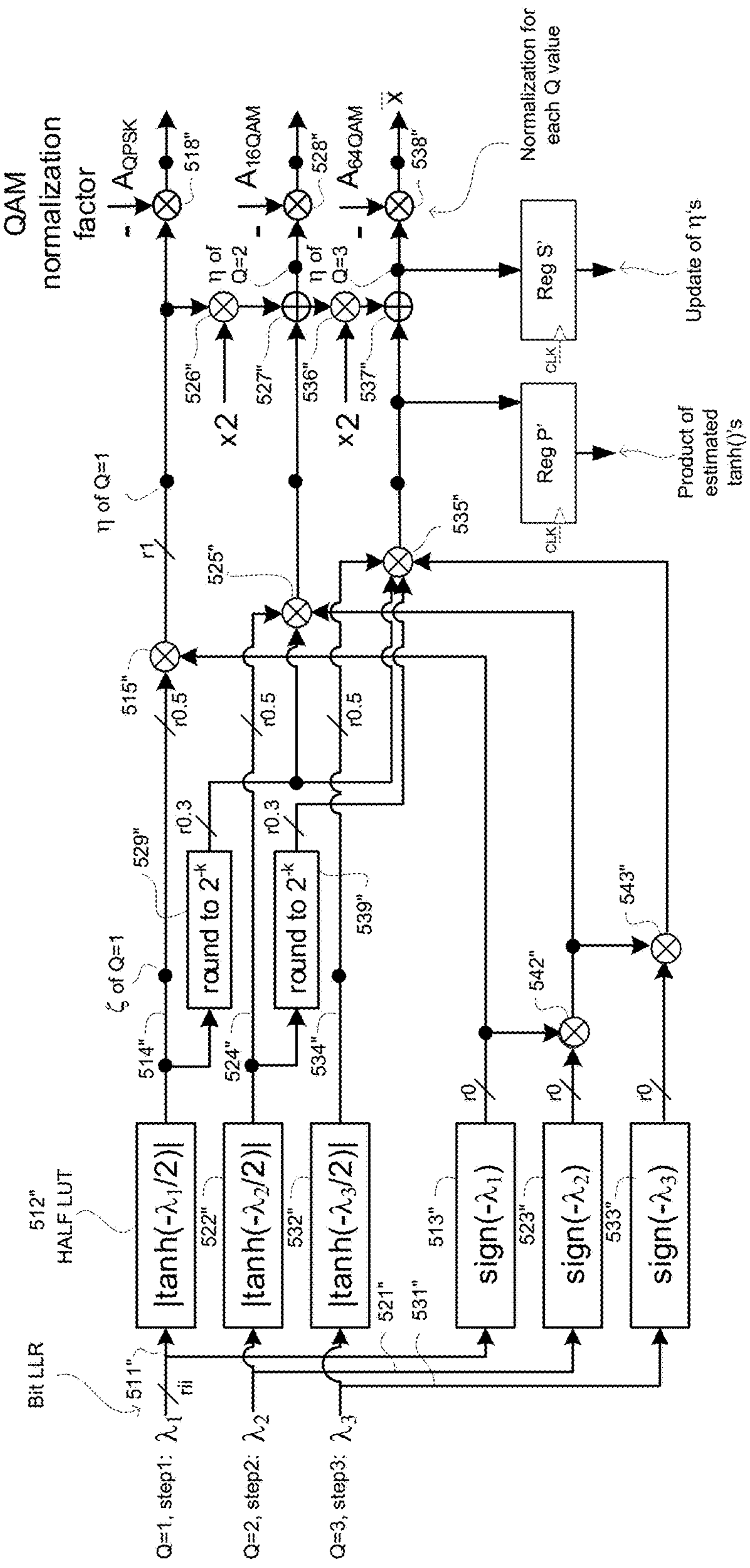
FIG. 5D is a schematic diagram of another mean determining circuit embodiment.

FIG. 5D illustrates a different embodiment 504 in which; instead of retaining |tan h(−λ$_i$/2)| for the most significant bit, e.g., |tan h(−λ$_1$/2)| as shown in FIG. 5C for the approximation of a product of tan h( ) values, the one that is kept as not being rounded is based on the least significant bit of the observed QAM mapping rules in a product of tan h( ) values. More specifically, if bit $b_3$ is the least significant bit among {$b_1$ $b_2$ $b_3$} in the product to be produced by multiplier 535", the value |tan h(−λ$_3$/2)| is retained, but |tan h(−λ$_2$/2)| and |tan h(−λ$_2$/2)| are approximated. Also bit $b_2$ is the least significant bit among {$b_1$ $b_2$} in the product to be produced by multiplier 525", the value |tan h(−λ$_2$/2)| is retained, but |tan h(−λ$_1$/2)| is approximated. Thus in FIG. 5D, the output 534" of tan h( ) generating unit 532" is fed as an r0.5 multiplicand to special purpose multiplier 535"; the output 524" of tan h( ) generating unit 522" is fed as an r0.5 multiplicand to special purpose multiplier 525" and the output 514" of tan h( ) generating unit 512" is fed as an r0.5 multiplicand to special purpose multiplier 515" while the further input multiplicands of special purpose multipliers 525" and 535" are $2^{-k}$ values or codes representing such power of two values. To avoid unnecessary repetition, double primed reference numbers (e.g., 511") are used in FIG. 5D for correspondingly numbered components in FIG. 5C.

Figure 6:
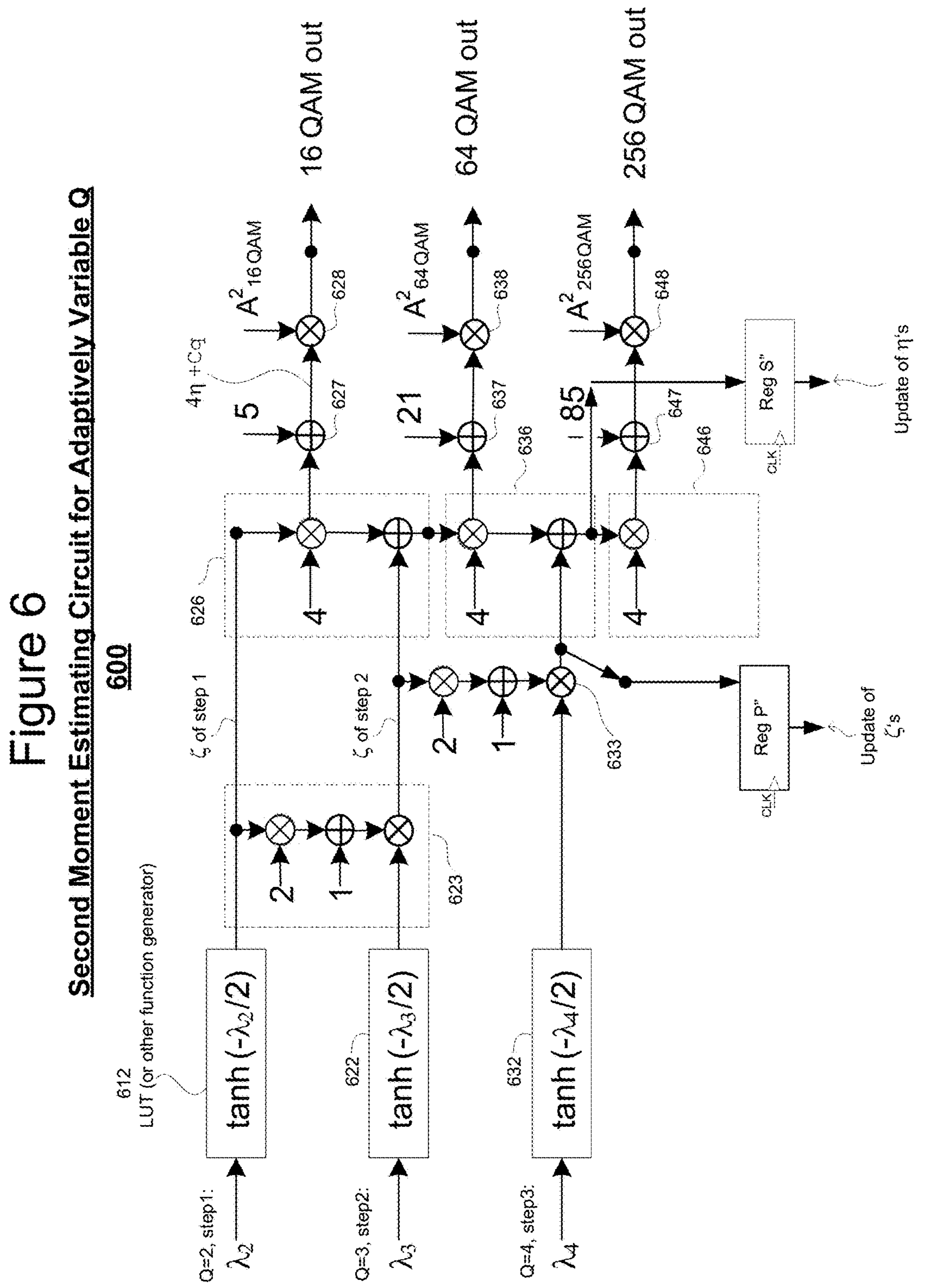
FIG. 6 is a schematic diagram of determining circuit embodiment for second moment estimation for variance estimation.

Referring to FIG. 6, a second moment estimating circuit 600 with repeated sections for variance estimation may be implemented using the following iteration (Iteration 3):

---

Obtain $\tanh\left(-\frac{\lambda_i}{2}\right)$, i = 2, … , $Q$, by LUT. Initially set $\eta = 0$, $$\zeta = \tanh\left(-\frac{\lambda_2}{2}\right).$$

- For i = 3, . . . , Q ,
  - Update ζ as $$\zeta \Leftarrow (2\zeta + 1)\cdot\tanh\left(-\frac{\lambda_i}{2}\right).$$

- Update η by
$$\eta \Leftarrow 4\eta + \zeta.$$
- Obtain $\hat{v}^2 = 4\eta + C_Q$ using the latest update of η.

---

In FIG. 6, the illustrated circuit 600 for producing output signals representing estimated second moment for eventually estimating variances for the cases of (4×4) QAM, (8×8) QAM and (16×16) QAM. It is to be understood that the illustrated tan h(x) function generating units 612, 622, 632 can be same ones as used in the mean estimation circuits for the corresponding LLR signals. It should be apparent from the foregoing that the illustrated repetitive circuit structures such as that in dashed block 623 and such as that in dashed block 626 can be further repeated for the next sequential cases of Q=5, Q=6 and so on. The resulting updates of Zeta's for the variance estimation and the resulting updates of Eta's also for the variance estimation may be captured in pipelining registers just such as the illustrated Reg P" and Reg S". Adders such as 627, 637 and 647 provide the specific Cq constants for the respective values of Q.

Figure 7:
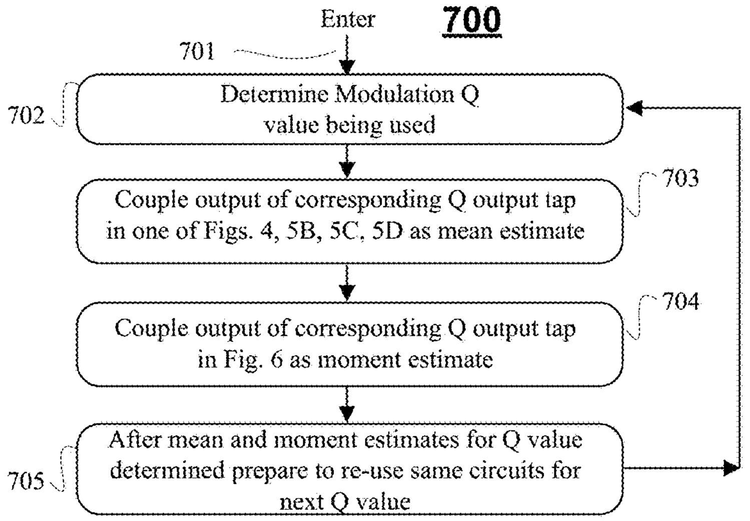
FIG. 7 is a flow chart for adaptively using the same circuits for different constellation sizes in accordance with the present disclosure.

Referring to FIG. 7, an exemplary example 700 of a method for selectively using the tapped outputs of a multi-Q circuit such as that (400) shown in FIG. 4 is described. Entry into the process may be made at 701. In step 702 a determination is made as to the Q parameter that will be next used for estimation of mean and moment values. An example of an encompassing system where a different Q parameters are used is an adaptive MIMO receiver that adaptively changes its internal configuration in response to control commands for using different quadrature modulation schemes.

Responsive to the determination made at step 702, in subsequent step 703 a coupling is made to the corresponding Q output tap in a multiply-tapped mean estimating circuit such as that of any one of FIGS. 4, 5B, 5C and 5D. Similarly in step 704, a coupling is made to the corresponding Q output tap in a multiply-tapped second moment estimating circuit such as that of FIG. 6.

The tapped mean and second moment estimating circuits are then used for generating and storing corresponding mean and second moment estimations for the determined Q parameter value. Then, in step 705 it is determined that all of the currently desired mean and second moment estimation signals for the current Q parameter value have been collected. The system is reset so as to be able to re-use the same mean and moment estimating circuits for a next commanded, Q parameter value. Control then loops back to step 7024 receiving the next commanded, Q parameter value.

Figure 8:
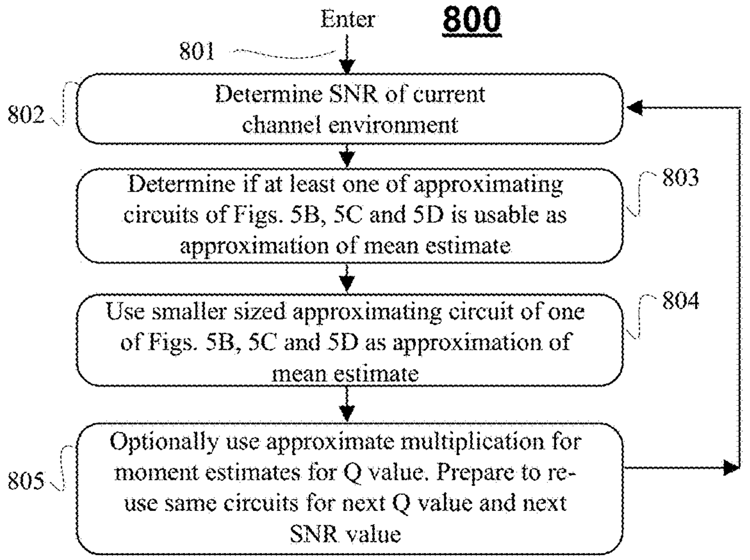
FIG. 8 is a flow chart for adaptively using the same circuits for different SNR environments in accordance with the present disclosure.

Referring to FIG. 8, an exemplary process 800 will now be described for selectively determining whether to use and approximating mean and/or second moment estimating circuit in place of a non-approximating one. Entry into the process flow may be made at 801. At step 802 a determination is made of the current signal to noise ratio (SNR) of the transmission medium in its current or predicted future state.

Using a predetermined performance comparison chart or graph (e.g., such as the graph in FIG. 2), a determination is made in step 803 as to whether at least one of pre-designed approximating circuits such as those shown in FIGS. 5B, 5C and 5D are acceptable for approximately estimating the mean parameter in view of the current or predicted future SNR states of the transmission medium and in view of block error rates (BLER's) determined to be acceptable for the given system. If acceptability is found then in step 804 one of the smaller sized approximating circuits such as from FIGS. 5B, 5C and 5D is used in place of a non-approximating circuit, thereby consuming less space for generating mean estimation signals. Optionally and similarly, moment estimation circuits such as the one shown in FIG. 6 may be modified to use smaller, special purpose multipliers in place of general purpose multipliers so as to reduce circuit size for moment estimation. The selectable Q parameter output taps of the approximating circuits may be used in similar manner as that of FIG. 7 for adapting to differently commanded Q parameter values. Accordingly, step 805 includes the substep of preparing to reuse the same circuits for a next commanded Q value and a next expected SNR value. Control loops back up to step 802 for repeat of steps 802-805. It may be noted that for the approximation approach, the wireless system can optionally implement one of the methods for mean and/or second moment estimations, e.g., one of exemplary implementations of FIGS. 5B, 5C, 5D for mean estimation, to reduce the complexity. There is no need in such cases to switch different implementation circuits based on SNR. It is shown in FIG. 2, for presented exemplary iterative MMSE SIC receiver for MIMO system, that the approximation method II with the exemplary implementation for mean estimation shown in FIG. 5D is more efficient with the performance close to the performance without any approximation for mean and second moment estimations. Thus method II may be kept for all SNR values.

Justifications for the development of the scalable recursive methods may be explained by the following.

It is possible to provide low-complexity methods for generating mean and variance signals for use in QAM estimation with applications to SIC receivers. In particular, the present disclosure provides efficient methods for optimal estimations that facilitate less circuitry in the hardware implementation and also make the implementation scalable to any Gray mapped PAM or QAM modulations. For variance estimation or specifically the second moment estimation, the proposed method reduces the complexity from $O((\log N)^2)$ in earlier used methods to $O(\log N)$ in the here disclosed methods. The disclosure also provides several alternative suboptimal methods for generating the soft QAM symbol mean and variance signals which methods avoid general purpose multiplications in the hardware implementations and replace them with simply binary shifts. In some instances, the disclosed approximation approaches provide similar or better block error (BLER) versus SNR performance than earlier methods but with simpler implementation and less logical circuitry.

An iterative receiver with soft interference cancellation (SIC) can provide near optimal performance for joint demodulation and decoding. An example of such an iterative receiver, or so-called turbo receiver, has been applied to equalization as set forth in M. Tüchler, R. Koetter, and A. C. Singer, "Turbo equalization: Principles and new results," IEEE Trans. Commun., vol. 50, no. 5, pp. 754-767, May 2002. Another example of such an iterative receiver has been applied to multiuser detection as set forth in X. Wang and H. V. Poor, "Iterative (turbo) soft interference cancellation and decoding for coded CDMA," IEEE Trans. Commun., vol. 47, no. 7, pp. 1046-1061, July 1999. Yet another example of such an iterative receiver has been applied to a Multiple-Input and Multiple-Output (MIMO) receiver as set forth in B. M. Hochwald and S. ten Brink, "Achieving near-capacity on a multiple-antenna channel," IEEE Trans. Commun., vol. 51, no. 3, pp. 389-399, March 2003.

From the LTE base station side, an iterative receiver with SIC can be applied to LTE uplink single-carrier frequency division multiple access (SC-FDMA) as set forth for example in T. Li, W. Wang, and X. Gao, "Turbo equalization for LTE uplink under imperfect channel estimation," in Proc. Personal, Indoor, and Mobile Radio Commun. (PIMRC), Tokyo, Japan, September 2009. It can be applied to uplink multiuser MIMO as set forth in M. Jiang, G. Yue, N. Prasad, and S. Rangarajan, "Link adaptation in LTE-A uplink with turbo SIC receivers and imperfect channel estimation," in Proc. Conf. Info. Sci. Syst. (CISS), Baltimore, Md., March 2011. It can further be applied to uplink coordinate multipoint (CoMP) reception with SIC (CoMP SIC).

One key operation in SIC type iterative receivers is that of real time generating of soft mean and variance signals for QAM estimations when provided with the log-likelihood ratios (LLR) of the coded bit sequence from the decoding outputs. When considering how to reduce complexity of SIC receivers, it is worthwhile to consider efficient approaches for soft symbol mean and variance determination. This can become particularly important for higher order quadrature symbol constellations QAM, e.g., 256-QAM in Release-12 LTE systems, or 4096-QAM in microwave transmissions. It has been shown for example in G. Yue, N. Prasad, and S. Rangarajan, "Iterative MMSE-SIC receiver with low-complexity soft symbol and residual interference estimations," in Proc. 39th Asilomar Conf. Signals, Systems and Computers, Pacific Grove, Calif., October 2013 (hereafter also "[reference 8]") that for a given QAM, symbol determination can be reduced in the order of the number of the bits that are mapped to the QAM symbol for the mean calculation and square of that for the variance calculation. The results may be derived by goal-ended reorganization of the signal processing operations performed on in-stream signals. Therefore, there is no performance loss in spite of the reorganization of the signal processing operations. However, from the resulting expressions, some general purpose multiplication operations on outputs of tan h functions still exist. A suboptimal approach is also proposed in G. Yue, N. Prasad, and S. Rangarajan, "Iterative MMSE-SIC receiver with low-complexity soft symbol and residual interference estimations," in Proc. 39th Asilomar Conf. Signals, Systems and Computers, Pacific Grove, Calif., October 2013 for removing general purpose multiplication operations to further reduce complexity. However, the suboptimal approach does not consider the different reliabilities of the bits of a QAM symbol and treat them equally rather than based on probabilities of correct decision.

In this disclosure, several efficient methods for optimal estimations are proposed which facilitate less circuitry in the hardware implementation and further reduce complexity of variance estimation. The present disclosure also proposes several alternative suboptimal methods which also avoid use of general purpose multiplication operations in processing the products of tan h outputs.

(2.1) The Signal Model

As an example, consider an iterative SIC receiver with minimum mean square error (MMSE) filtering for use in a MIMO system having $M_T$ transmit antennas and $M_R$ receive antennas. Assume $M_R \geq M_T$. Denote $x=[x_1, \ldots, x_{M_T}]^T$ as the QAM symbol vector. The received signal may then be given by the following equation (1):

$$y = Hx + n = \sum_{i=1}^{M_T} h_i x_i + n, \tag{1}$$

where $H=[h_1, \ldots, h_{M_T}]$ is the $M_R \times M_T$ complex channel matrix and the component $h_i$ is the channel vector from the ith transmit antenna to the receiver antenna array, and n denotes the i.i.d. complex zero-mean white Gaussian noise vector with unit variance, i.e., n: $C_N(0, I)$ and I is $M_R \times M_R$ identity matrix. We consider the QAM symbol sequence sent from all transmit antennas are jointly coded with one channel code. We also consider the block fading model in which the channel gain matrix H remains constant for the entire code block.

(2.2) Iterative MMSE-SIC Receiver

Given as inputs, the extrinsic log-likelihood ratios (LLRs) of the coded bits from the soft channel decoder in the previous iteration, it is possible to obtain the soft estimation of the QAM symbol $x_i$, denoted as $\tilde{x}_i=E\{x_i\}$, i=1, . . . , $M_T$. To improve the detection of the ith QAM symbol $x_i$, it is possible to perform the SIC for QAM symbols $x_j$, $j\neq 1$. The result signal is then given by following equation (2):

$$y_i = h_i x_i + \sum_{j\neq i} h_j (x_j - \tilde{x}_j) + n. \tag{2}$$

The linear MMSE filter can then be obtained, given by (3):

$$w_i = \left(h_i h_i^\dagger + \sum_{j\neq i} \tilde{\sigma}_j^2 h_j h_j^\dagger + I\right)^{-1} h_i, \tag{3}$$

where $^\dagger$ denotes matrix Hermitian, $\Sigma_{j\neq 1}\tilde{\sigma}_j^2 h_j h_j^\dagger$ is covariance of the residual interference after SIC, and then square variance is provided by (4):

$$\tilde{\sigma}_j^2 = \mathrm{var}\{x_j - \tilde{x}_j\} = E\{|x_j|^2\} - |\tilde{x}_j|^2. \tag{4}$$

With that the MMSE-SIC filtering output is then given by (5):

$$\tilde{x}_i = w_i^\dagger y_i. \tag{5}$$

Assuming that $\tilde{x}_i$ is Gaussian distributed, it is possible to then obtain the LLR's for the binary labeling bits that are mapped to the QAM symbol $x_i$ and send the extrinsic information to the soft channel decoder. The output extrinsic LLR's from the soft decoder are then fed back as the prior LLR's for a next iteration of MMSE-SIC. Initially, the iterative process may start with a soft estimate of $\tilde{x}_i=0$. Details for a general iterative MMSE-SIC receiver can be found in G. Yue and X. Wang, "Optimization of irregular repeat accumulate codes for MIMO systems with iterative receivers," IEEE Trans. Wireless Commun., vol. 4, no. 6, pp. 2843-2855, November 2005.

It can be seen from above that for a SIC iterative receiver, it is possible to obtain the soft QAM estimation, $\tilde{x}_i$, and the variance of the QAM symbol $\tilde{\sigma}_i^2$ for purpose of estimation of the residual interference. It may be see is seen from equation (4) that when the soft estimation $\tilde{x}_i$ is obtained, a further problem left for the variance estimation operation is the estimation of the second moment of the QAM symbol, $E\{|x_j|^2\}$.

(3.1) Definitions

A set of symbols may be distributed in a n×m (=N) quadrature constellation, for example as the N-QAM constellation set $S_{QAM}=\{s_1, \ldots, s_N\}$, with each symbol mapped from a length-J binary sequence, $b_1, \ldots, b_J$, where $J=\log_2 N$ and $b_i \in \{0,1\}$. It may be assumed that the QAM symbols are integer values on I and Q axis components, i.e., 2z+1, z=0, ±1, . . . . It is possible to then normalize the QAM signal for a unit average power with the scaling factor of $$\frac{1}{\sqrt{E_N}},$$

where $E_N$ is the variance of the QAM inputs. Assuming equiprobable inputs, then the following normalized power can be given in accordance with equation (6):

$$E_N = \frac{1}{N}\sum_{n=1}^{N} |s_n|^2 = \frac{2}{3}(N-1). \tag{6}$$

(3.1.1) Mean Estimation

Given an LLR named $\lambda_i$ then for $b_i$, i=1, . . . , J, mapped to the QAM symbol $x_{qam} \in S_{QAM}$, it is possible to then form the soft symbol or the mean estimation of $x_{qam}$ per equation (7):

$$\tilde{x}_{qam} = \sum_{s\in S_{QAM}} s Pr(x_{qam}=s) = \sum_{n=1}^{N} s_n \prod_{i=1}^{J} P_{b_i}(s_{n,i}), \tag{7}$$

where $s_{n,i}$ denotes the ith bit in the length-J bit sequence that is mapped to the QAM symbol $s_n$, $$P_{b_i}(i) \triangleq Pr(b_i = i),$$

$i \in \{0,1\}$, and $$P_{b_i}(0) = (e^{-\lambda_i}+1)^{-1},\ P_{b_i}(1) = (e^{\lambda_i}+1)^{-1}.$$

It can be seen that the overall complexity is O(N log N).

For a square QAM constellation with orthogonal mapping of I and Q components, the QAM symbol estimation can be decoupled into two, one dimensional pulse-amplitude modulation (PAM) estimations, each given by following equation (8):

$$\tilde{x} = \sum_{s \in S_{PAM}} s P_x(s) = \sum_{n=1}^{N'} s_n \prod_{i=1}^{Q} P_{b_i}(s_{n,i}), \tag{8}$$

where $$N' = \sqrt{N},\ Q = \frac{J}{2},$$

and $s_{n,j}$ is now the ith bit mapped to the PAM symbol $s_n$. It can be seen that PAM estimation in equation (8) requires QN' multiplications and N'−1 additions. Thus overall the squared QAM estimation needs $2Q\sqrt{N}$ multiplications and $2\sqrt{N}-2$ additions. The complexity order is then $O(\sqrt{N} \log N)$, which is lower than the above given value of O(N log N).

(3.1.2) Variance Estimation

As described in above Section 2, after obtaining the soft symbol estimate, the estimation of the variance of the residual interference after SIC becomes the second moment estimation. The general definition of the second moment estimation is given per equation (9):

$$\tilde{v}_{qam}^2 \triangleq E\{|x_{qam}|^2\} = \sum_{s \in S_{QAM}} |s|^2 Pr(x_{qam} = s) = \tilde{v}_I^2 + \tilde{v}_Q^2, \tag{9}$$

where $$\tilde{v}_I^2 \triangleq \sum_{s \in S_{QAM}} s_I^2 Pr(x_{qam} = s),\ \tilde{v}_Q^2 \triangleq \sum_{s \in S_{QAM}} s_Q^2 Pr(x_{qam} = s),$$

$s_I$ and $S_Q$ denote the I and Q values of the QAM symbol s, respectively. The complexity of the estimation using the above expression is O(N log N).

Similarly as for mean estimation, we consider the squared QAM which can be decoupled to two orthogonal PAMs. Assuming an N'-PAM constellation set $S_{PAM}=\{s_1, \ldots, s_{N'}\}$ with $N'=2^Q$, it is possible to then have the second moment estimation for PAM symbols given in accordance with following equation (10):

$$\tilde{v}_{pam}^2 \triangleq \sum_{n=1}^{2^Q} s_n^2 Pr(x = s_n). \tag{10}$$

The above equation (10) can be applied to obtain $\tilde{v}_I^2$ and $\tilde{v}_Q^2$ in equation (9) separately. The complexity is then reduced to $O(\sqrt{N} \log N)$.

(3.2) Approaches for Gray Mapped QAM Symbols

Referring to G. Yue, N. Prasad, and S. Rangarajan, "Iterative MMSE-SIC receiver with low-complexity soft symbol and residual interference estimations," in Proc. 39th Asilomar Conf. Signals, Systems and Computers, Pacific Grove, Calif., October 2013, and by reordering the signal processing operations, the expressions for the efficient mean and variance estimations can be obtained for both squared QAM and non-squared QAM. Consider the squared QAM as an example. For squared QAM, the soft mean and variance (or specifically the second moment) estimation can be decoupled to two PAM estimations. Also consider the FIG. 9 binary reflect Gray code (BRGC) based tree mapping 900 which is the common Gray mapping employed in wireless systems.

(3.2.1) Mean Estimation

Figure 9:
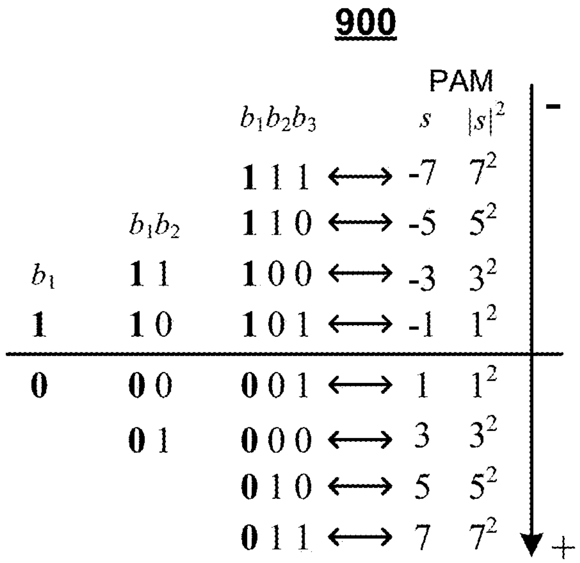
FIG. 9 is a BRGC mapped PAM constellations before power normalization reading left to right: 2-PAM(BPSK), 4-PAM, and 8-PAM in accordance with the present disclosure.

For a $2^Q$-PAM symbol with Gray mapping as shown in the BRGC mapping 900 of FIG. 9, the soft mean estimation is given by following equation (11):

$$\tilde{x} = -\sum_{i=1}^{Q} 2^{Q-i} \prod_{j=1}^{i} \tanh\left(-\frac{\lambda_j}{2}\right). \tag{11}$$

Note that the above result is derived for PAM symbols 2z+1 before normalization for unit average power. After that, a scaling factor $$A_{N-QAM} = \frac{1}{\sqrt{E_N}}$$

is applied for both I and Q components for QAM normalization.

Based on above equation (11), an iterative digital processing operation for soft PAM estimation can then be formed as follows.

---

- Initially set η = 0 and ξ = 1.
  - For i = 1 . . . , Q , update ξ and η sequentially as $$\xi \Leftarrow \xi \cdot \tanh\left(-\frac{\lambda_i}{2}\right), \text{ then } \eta \Leftarrow \eta + 2^{Q-1} \cdot \xi.$$

- The PAM soft estimate is then obtained as $\tilde{x} = -\eta$ using the last update of η.

---

Since the hyperbolic tangent function tank can be implemented by a look-up table (LUT), the overall complexity for above soft PAM estimation algorithm can be made very low, e.g., in the order of log N. Note that all the multiplications with $2^i$ can be implemented with bit shifting and padding in of zeros for locations from which original bits were shifted out. Thus the associated complexity for such bit shifting operations can be ignored.

3.2.2 Variance Estimation

As aforementioned, for variance estimation, it is possible to determine the second moment estimation $\tilde{v}^2$ for a PAM symbol. An efficient expression is derived in [reference 8]. Given the LLRs $\lambda_i$, i=1, . . . , Q, the second moment estimate $\tilde{v}^2$ for a $2^Q$-PAM symbol with Gray mapping can be determined in accordance with the following equation (12):

$$\tilde{v}^2 = C_Q + \sum_{i=2}^{Q} 4^{Q-i+1} \sum_{j=2}^{i} 2^{i-j} \prod_{k=j}^{i} \tanh\left(-\frac{\lambda_k}{2}\right), \tag{12}$$

where $C_Q$ is a constant depending on Q and can be obtained iteratively by following equation (13):

$$C_q = 4C_{q-1} + 1,\ q = 1, \ldots, Q, \text{ with } C_0 = 0. \tag{13}$$

The estimation in equation (12) is before the normalization. After the estimation, the normalization factor $$\frac{1}{E_N}$$

is then applied for the N-QAM modulation.

In [reference 8] an iterative digital processing operation based on equation (12) to obtain $\tilde{v}^2$ can then be derived as follows.

---

- Initially set $\eta = 0$. Obtain $\tanh\left(-\frac{\lambda_i}{2}\right)$, i = 2, . . . , Q, by LUT.
- For i = Q,Q − 1, . . . ,2 ,
  - Set $\zeta = 0$ and $\xi = 1$.
  - For j = i, . . . ,2 , update $\xi$ and $\zeta$ sequentially by $\xi \Leftarrow \xi \cdot \tanh\left(-\frac{\lambda_j}{2}\right)$, then $\zeta \Leftarrow \zeta + 2^{i-j}\xi$.
  - Update $\eta$ by $\eta \Leftarrow \eta + 4^{Q-i+1}\zeta$.
- Obtain $\tilde{v}^2 = \eta + C_Q$ using the latest update of $\eta$.

---

(3.2.3) Examples

The mean and second moment estimation of 4-PAM (corresponding to one axis of a 4λ4=16QAM constellation) before normalization can be respectively given by:

$$\tilde{x} = -2\tanh\left(-\frac{\lambda_1}{2}\right) - \tanh\left(-\frac{\lambda_1}{2}\right)\tanh\left(-\frac{\lambda_2}{2}\right),$$

$$\tilde{v}^2 = 5 + 4\tanh\left(-\frac{\lambda_2}{2}\right).$$

The mean and second moment estimation of an 8-PAM (corresponding to 8×8=64QAM) before normalization can be respectively given by:

$$\tilde{x} = -4\tanh\left(-\frac{\lambda_1}{2}\right) - 2\tanh\left(-\frac{\lambda_1}{2}\right)\tanh\left(-\frac{\lambda_2}{2}\right) - \tanh\left(-\frac{\lambda_1}{2}\right)\tanh\left(-\frac{\lambda_2}{2}\right)\tanh\left(-\frac{\lambda_3}{2}\right),$$

$$\tilde{v}^2 = 21 + 4^2\tanh\left(-\frac{\lambda_2}{2}\right) + 4\cdot 2\cdot\tanh\left(-\frac{\lambda_2}{2}\right)\tanh\left(-\frac{\lambda_3}{2}\right) + 4\tanh\left(-\frac{\lambda_3}{2}\right).$$

The mean and second moment estimation of a 16-PAM (corresponding to 16×16=256QAM) before normalization can be respectively given by:

$$\tilde{x} = -8\tanh\left(-\frac{\lambda_1}{2}\right) - 4\tanh\left(-\frac{\lambda_1}{2}\right)\tanh\left(-\frac{\lambda_2}{2}\right) - 2\tanh\left(-\frac{\lambda_1}{2}\right)\tanh\left(-\frac{\lambda_2}{2}\right)\tanh\left(-\frac{\lambda_3}{2}\right) - \tanh\left(-\frac{\lambda_1}{2}\right)\tanh\left(-\frac{\lambda_2}{2}\right)\tanh\left(-\frac{\lambda_3}{2}\right)\tanh\left(-\frac{\lambda_4}{2}\right),$$

$$\tilde{v}^2 = 85 + 4^3\tanh\left(-\frac{\lambda_2}{2}\right) + 4^2\cdot\left(2\cdot\tanh\left(-\frac{\lambda_2}{2}\right)\tanh\left(-\frac{\lambda_3}{2}\right) + \tanh\left(-\frac{\lambda_3}{2}\right)\right) + 4\left(2^2\cdot\tanh\left(-\frac{\lambda_2}{2}\right)\tanh\left(-\frac{\lambda_3}{2}\right)\tanh\left(-\frac{\lambda_4}{2}\right) + 2\cdot\tanh\left(-\frac{\lambda_3}{2}\right)\tanh\left(-\frac{\lambda_4}{2}\right) + \tanh\left(-\frac{\lambda_4}{2}\right)\right).$$

(3.3) Simplified Hardware Implementation Procedures (3.3.1) Mean Estimation

Instead of the complex procedures described in Section 3.2.1, the data processing operations are changed to provide the following iterative procedure:

---

- Initially set $\eta = 0$ and $\xi = 1$.
  - For i = 1 . . . , Q , update $\xi$ and $\eta$ sequentially as $\xi \Leftarrow \xi \cdot \tanh\left(-\frac{\lambda_i}{2}\right)$, then $\eta \Leftarrow 2\eta + \xi$.
  - The PAM soft estimate is then obtained as $\tilde{x} = -\eta$ using the last update of $\eta$.

---

Referring to FIG. 4, it can be seen that with the above changed iteration process, the generation and update of the Eta value $\eta$ does not have modulation dependent parameter $2^{Q-i}$. Such change makes the circuit implementation for one iteration reusable for different modulations or makes the implementation scalable for higher order QAM modulations.

For example, the implementation according to the procedures in Section 3.2.1 can be represented by the circuitry shown in FIG. 4. It is shown that different parameters $2^{Q-i}$ can be fed in to compute the final outputs for different PAM's or respective values of Q=1, Q=2, Q=3, Q=4, etc. or corresponding QAM modulations of $(Q^2)^2$=1, 16, 64 256, etc. Based on the illustrated operations, there is no need to change the parameters and the implementation can be scalable for any modulations. The new implementation as shown in FIG. 4 where the scaling factor $$A_N = \frac{1}{\sqrt{E_N}}$$

for an N-QAM. It is seen from FIG. 4 that for the mean estimations of PAM symbols, corresponding to the I or Q component of a squared QAM, one circuitry implementation can be applied to any Gray mapped PAM or square QAM without any parameter change. This is desirable for the wireless communication systems as adaptive modulation is commonly employed to improve the throughput efficiency for channel fluctuations. The implementation is scalable to any higher order QAM formats.

3.3.2 Variance Estimation

Method 1:

Similar to the way that simplification is provided for mean estimation, it is possible to make the following changes in the iteration process for determining the second moment estimation as follows.

---

- Initially set $\eta = 0$. Obtain $\tanh\left(-\frac{\lambda_i}{2}\right)$, i = 2, … , Q, by LUT.
- For i = 2,3, . . . ,Q ,
  - Set $\zeta = \tanh\left(-\frac{\lambda_i}{2}\right)$ and $\xi = \tanh\left(-\frac{\lambda_i}{2}\right)$.
  - For j = i − 1, . . . ,2 , update ξ and ζ sequentially by $\xi \Leftarrow \xi \cdot \tanh\left(-\frac{\lambda_j}{2}\right) \cdot 2$, then $\zeta \Leftarrow \zeta + \xi$.
  - Update η by $\eta \Leftarrow 4\eta + \zeta$.
- Obtain $\hat{v}^2 = 4\eta + C_Q$ using the latest update of η.

---

It can be seen that that with the above changes, the digital data processing operations do not have Q dependent parameters. The procedures can be efficiently implemented similar to the mean estimation. It is then also scalable for larger values of Q with the predetermined values for smaller Q stored and thus reusable.

Method 2:

By carefully examining the result in equation (12), another data processing algorithm per we now propose the following can be used to further reduce the computation complexity to the order O(log N) from $O((\log N)^2)$ where the latter are more complex order is needed in [reference 8].

---

- Obtain $\tanh\left(-\frac{\lambda_i}{2}\right)$, i = 2, … , Q, by LUT. Initially set $\eta = 0$, $\zeta = \tanh\left(-\frac{\lambda_i}{2}\right)$.
- For i = 3, . . . ,Q ,
  - Update ζ as $\zeta \Leftarrow (2\zeta + 1) \cdot \tanh\left(-\frac{\lambda_i}{2}\right)$.
  - Update η by $\eta \Leftarrow 4\eta + \zeta$.
- Obtain $\hat{v}^2 = 4\eta + C_Q$ using the latest update of η.

---

It can be seen that the inner iteration from Method 1 has been removed. The additional complexity introduced is the addition operation of +1 when updating the Zeta ζ in each iteration. If it is difficult from Method 1 to see the scalability for different QAM modulations, but it thereafter becomes clearer in FIG. 6. for Method 2. With another iteration of updating ζ and η with the input of $\lambda_{Q+1}$, one can obtain the moment estimation for $2^{Q+1}$-PAM from the results of $2^Q$-PAM. The implementation based on Method 2 is illustrated in FIG. 6.

(4) Suboptimal Approaches for Hardware Implementations

The approaches described in Section 3 are optimal for both soft mean and variance estimations. To further reduce the complexity, the suboptimal approach with approximations can be considered to avoid multiplications that are more complex than additions in hardware implementations. It can be seen that in equations (11) and (12), the majority part for the complexity is the generating of the products of the tan h( ) functions. An example of the mean estimation according to equation (11) is shown in FIG. 3 and FIG. 4.

(4.1) Approximation Approaches

The basic idea is to find an approximation for the product of tan h functions, e.g., $$\Theta_{j_1,j_2} \triangleq \prod_{i=j_1}^{j_2} \tanh(\lambda_i/2).$$

A method is provided in [reference 8] and recapitulated as follows.

---

- Let $\varphi_i = \tanh(-\lambda_i/2)$. First obtain the maximum $\psi_{i^*} = \max_{i=j_1,\ldots,j_2} |\varphi_i|$.
- For other i, since $|\varphi_i| \le 1$, it can be approximated (or quantized with the fixed point representation) by $\Sigma_k a_{i,k} 2^{-k}$, $a_{i,k} \in \{0,1\}$. Then for each $|\varphi_i|$, $i \ne i^*$ in the production, we first find the first non-zero bit, $a_{i,k_i'} \ne 0$, i.e., $a_{i,k} = 0$ for $k < k_i'$. We then check the bit followed, i.e., $a_{i,k_i'+1}$. We then approximate $|\phi_j|$ by $2^{-k_i'}$ if $a_{i,k_i'+1} = 0$ or $|\phi_j| \approx 2^{-k_i'}$ if $a_{i,k_i'+1} = 1$. It means that we round $|\phi_j|$ to the closest $2^{-k}$.

---

Mathematically, this provides the following equation (14):

$$\Theta_{j_1,j_2} \approx \psi_{i^*} 2^{\sum_{i=j_1,\ldots,j_2;i\ne i^*}\left(k_i'-a_{i,k_i'+1}\right)} \prod_{i=j_1}^{j_2} \mathrm{sgn}(\phi_i). \tag{14}$$

FIG. 5B shows the mean estimation of an 8-PAM symbols system based on the above description where two comparisons are used to replace the max operations. It can be seen that multiplication is avoided with the approximation and replaced by the bit-wise shift. However, as can be further seen, the max operation is applied to each product, which is not scalable for different modulation values (e.g., Q=1, Q=2, etc.), particularly for the second moment estimations. For mean estimation, although the max operations can be replaced by hierarchical comparisons, the logic is still quite complicated. It is also difficult to make the implementation scalable for different QAM modulations.

(4.2) Proposed Suboptimal Approaches

A couple of alternative suboptimal approaches are proposed below which can simplify the hardware implementations. For some approaches, it has been found by simulation that the simplified approaches may provide better receiver BLER vs. SNR performance than the more complex approaches.

(4.2.1) Alternative Method I

It is seen that the approximation provided in [reference 8] treats the binary bits mapped as QAM symbols equally. It does not consider different reliability of the bits after the demodulations due to different average Euclidean distances for the labeling bits. It is known that the more significant bit, e.g., the $b_i$ in the bit sequence for the 4-PAM or 8-PAM as shown in the above bit significance tree has the most reliable LLR statistically because of large average Euclidean distance of the PAM symbols for this bit. Thus in the first approach, it is proposed that the approximation of the production of tan h be as follows. Assuming the same bit labeling order as shown in tree chart, the bit significance for a Gray mapped PAM symbol from high to low is b1, $b_2, \ldots, b_Q$. Thus in the production of tan h, since the one with the lowest index has the highest reliability, the process can then retain the tan h value for the most significant bit in the production for the production, and approximate other values to a nearest $2^{-k}$ value in the range −1 to +1. The procedure is described as follows.

---

- Let $\varphi_i = \tanh(-\lambda_i/2)$ and obtain $\psi_i = |\varphi_i|$. For $i = j_1$, retain the value of $\psi_i$.
- For $i = j_1 + 1, \ldots, j_2$, we first find the first non-zero bit, $a_{i,k_i'} \neq 0$, i.e., $a_{i,k} = 0$ for $k < k_i'$. We then check the bit followed, i.e., $a_{i,k_i'+1}$. We then approximate $|\phi_j|$ by $2^{-k_i'}$ if $a_{i,k_i'+1} = 0$ or $|\phi_j| \approx 2^{-k_i'}$ if $a_{i,k_i'+1} = 1$. It means that we round $|\phi_j|$ to the closest $2^{-k}$.

---

Mathematically, this gives the following equation (15):

$$\Theta_{j_1,j_2} \approx \psi_{i^*} 2^{\sum_{i=j_1,\ldots,j_2;i\neq i^*}\left(k_i'-a_{i,k_i'+1}\right)} \prod_{i=j_1}^{j_2} \mathrm{sgn}(\phi_i). \tag{15}$$

Since the selection is deterministic for every production of tan h, the implementation can then be simplified and it is also scalable to any QAM modulations. The schematic is shown in FIG. 5C.

Saturation Protection:

Since tan h(x) is in the range of [−1,+1], when the absolute value $|\lambda_i|$ is large, the value of tan $h(-\lambda_i/2)$ is easily saturated, particularly for the higher reliable labeling bit. It is then inefficient to retain the saturated value and approximate other tan h outputs. To overcome this inefficiency, it is proposed to add a protection to the implementation as follows.

---

- Set a threshold $\delta_{th}$ which can be one or close to one.
- Initially Set $i = j_1$. While $\psi_i = \tanh(-\lambda_i/2) \geq \delta_{th}$ and $i \leq j_2$, round $\psi_i$ to the closest $2^{-k}$ and let $i \Leftarrow i + 1$.
- Retain the value $\psi_i$ and round $\psi_j$, $j = i + 1, \ldots, j_2$ to the closest $2^{-k}$.

---

For fixed point implementation with quantized LLR, the threshold $\delta_{th}$ can be set to 1.

4.2.2 Alternative Method II

This alternative method is based on the thought that the least significant bit creates the most residual interference for the last several iterations. So instead of retaining the value of $\psi_i$ for the most reliable bit, it is proposed to keep the one for the least reliable bit, i.e., least significant bit in the bit sequence in a production tan h. The Method II is summarized as follows.

---

- Let $\varphi_i = \tanh(-\lambda_i/2)$ and obtain $\psi_i = |\varphi_i|$. For $i = j_2$, retain the value of $\psi_i$.
- For $i = j_1, \ldots, j_2 - 1$, we first find the first non-zero bit, $a_{i,k_i'} \neq 0$, i.e., $a_{i,k} = 0$ for $k < k_i'$. We then check the bit followed, i.e., $a_{i,k_i'+1}$. We then approximate $|\phi_j|$ by $2^{-k_i'}$ if $a_{i,k_i'+1} = 0$ or $|\phi_j| \approx 2^{-k_i'}$ if $a_{i,k_i'+1} = 1$. It means that we round $|\phi_j|$ to the closest $2^{-k}$.

---

Mathematically, the following equation (16) is obtained:

$$\Theta_{j_1,j_2} \approx \psi_{i^*} 2^{\sum_{i=j_1,\ldots,j_2;i\neq i^*}\left(k_i'-a_{i,k_i'+1}\right)} \prod_{i=j_1}^{j_2} \mathrm{sgn}(\phi_i). \tag{16}$$

The resulting implementation is illustrated in FIG. 5D. Again, the selection of tan h in a production to keep is deterministic. The implementation is scalable for any QAM formats. Similarly as for Method I, one can add protection to avoid retaining zero value of tan h by checking its value.

Note that the approximation approach method in [reference 8] and proposed Method I may not be suitable for the Method 2 for the second moment estimation. However, the proposed Method II can be applied to the Method 2 for the second moment estimation, which makes this approximation method more attractive.

(5) Numerical Simulation Results

Referring to FIG. 2 numerical computer simulations are used to evaluate the performance of various iterative MMSE-SIC receiver designs for 4×4 MIMO block fading channels with proposed suboptimal approximation approaches for both symbol and variance estimations described in Section 4. The simulated information block length is 1024 bits. MIMO block fading channel is considered without spatial correlations. The results of the block error rate (BLER) performance as a function of SNR for 16-QAM are presented in FIG. 2. For performance comparisons, FIG. 2 includes the BLER performance of non-iterative MMSE receiver and the approximation method in [reference 8]. A rate-0.5 turbo code in 3G standard (see 3GPP, "Multiplexing and channel coding (FDD), Tech. Rep. 3GPP TS 25.212 V5.4.0, March 2003) is employed. For 16-QAM, the approximation on the mean estimation is used. As can be seen, the proposed approximation Method I with deterministic selection for the most significant bit results in similar performance as the earlier more complex method but while using less complex logic circuitry in the implementation. The proposed approximation Method I with saturation protection and proposed approximation method II performs better than the more complex earlier method when BLER is below $10^{-2}$. Both methods perform close to an exact calculation that does not use any approximations. Comparing these two, the approximation Method II shows slightly better performance than Method I with protection in the lower BLER regions.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A digital circuit for producing signals representative of mean estimations of quadrature amplitude modulation (QAM) symbols, the circuit comprising:

sequentially repeated first circuit components for producing updates of Eta values (η's) used in a corresponding estimation iteration for producing the signals representative of the mean estimations;

wherein each of the sequentially repeated first circuit components comprises a multiplier unit that updates a value of an Eta value (η) received from a sequentially previous first circuit component by multiplying by an amount greater than one and an adder that adds a respective Xi value (ξ) to the increased Eta value;

hyperbolic tangent function generating units each disposed in a respective one of sequentially repeated second circuit components, wherein each of the hyperbolic tangent function generating units includes a lookup table (LUT) for generating a signal representing a tan h( ) transformation for a respective function of a log likelihood ratio (LLR) signal; and multiplier units that each generate the respective Xi value (ξ) by multiplying a respective Xi (ξ) value used by a sequentially previous first circuit component by the hyperbolic tangent function output from the respective hyperbolic tangent function generating unit.

2. The circuit of claim 1 wherein the multiplier unit of each of the first circuit components includes a digital shifter that shifts to the left so as to perform multiplication by an integer power of two.

3. The circuit of claim 1 further comprising:

a first value substituting unit configured to substitute for a produced output of a hyperbolic tangent function generating unit, a digital first signal representing two raised to an integer power; and a first special purpose multiplier configured to receive at a first multiplicand input port thereof the first signal representing two raised to the integer power, the first special purpose multiplier being further configured to receive at a second multiplicand input port thereof a digital second signal of predefined bit resolution produced by a hyperbolic tangent function generating unit and configured to perform corresponding multiplication by performing binary shifting of the second signal in accordance with a shift amount associated with the first signal.

4. The circuit of claim 3 further comprising:

a second value substituting unit configured to substitute for a produced output of a hyperbolic tangent function generating unit, a digital third signal representing two raised to an integer power;

wherein the first special purpose multiplier is further configured to perform corresponding multiplication by performing binary shifting of the second signal in accordance with a shift amount associated with the third signal.

5. The circuit of claim 1 wherein:

one of two or more produced outputs of corresponding two or more hyperbolic tangent function generating units in a product that is used for the mean estimation is retained with its value with the predefined bit resolution produced by the hyperbolic tangent function generating unit, and all other produced outputs of corresponding two or more hyperbolic tangent function generating units are each rounded to their closest one of two raised to an integer power.

6. The circuit of claim 5 wherein:

the one of two or more produced outputs of a corresponding two or more hyperbolic tangent function generating units in a product that is retained with its value is for a bit within the LLR inputs to the hyperbolic tangent function generating units that is a most significant bit among the bits for a QAM mapping in a product of the outputs from the hyperbolic tangent function generating units.

7. The circuit of claim 5 wherein:

the one of two or more produced outputs of a corresponding two or more hyperbolic tangent function generating units in a product that is retained with its value is for a bit within the LLR inputs to the hyperbolic tangent function generating units that is a least significant bit among the bits in a QAM mapping in a product of the outputs from the hyperbolic tangent function generating units.

8. The circuit of claim 1 further comprising:

pipelining registers operatively coupled to synchronously store corresponding ones of generated respective Xi values (ξ's) and of updates of Eta values (η's).

9. The circuit of claim 1 wherein two or more hyperbolic tangent function generating units are each disposed in a respective one of sequentially repeated second circuit components and each of the hyperbolic function generating units includes at least a lookup table (LUT) for generating a signal representing a tan h( ) transformation for a respective log likelihood ratio (LLR) signal.

10. The circuit of claim 1 wherein each of the sequentially repeated first circuit components is coupled to a respective output circuit having a digital multiplier receiving a corresponding normalization factor as a multiplicand.

11. A digital circuit for producing signals representative of second moment estimations of quadrature amplitude modulation (QAM) symbols, the circuit comprising:

sequentially repeated first circuit components each for producing updates of Zeta values (ζ's) used in a corresponding second moment estimation iteration, wherein each sequentially repeated first circuit component includes:

a first multiplier configured to multiply a Zeta value (ζ) of a previous iteration by two;

an adder configured to add a value of one to the output of the first multiplier, and a second multiplier configured to multiply the output of the adder with the output of a circuit block producing a tan h(x) function for a bit input in a current iteration whereby a respective update of a Zeta value is obtained as $\zeta^{(i)}=(\zeta^{(i-1)}*2+1)*\tanh(-\lambda i/2)$, where i denotes the current iteration and i−1 denotes the previous iteration; and sequentially repeated second circuit components each for producing updates of Eta values (η's) used in the corresponding second moment estimation iteration;

wherein each sequentially repeated second circuit component includes an output signal tap for outputting to a Q value driven selector, a respective second moment estimation signal corresponding to a specified value of Q, the specified value of Q indicating a number of bits mapping to a pulse amplitude modulation (PAM) symbol which is one dimension of a QAM symbol.

12. The digital circuit of claim 11 wherein each second circuit component includes:

a first multiplier configured to multiply an Eta value (η) of a previous iteration with a value of 4 and an adder configured to add to the output of the first multiplier, the updated Zeta value (ζ) from a first circuit component of the sequentially repeated first circuit components, wherein a respective update of the Eta value (η) is denoted as $\eta^{(i)}=4\eta^{(i-1)}+\zeta^{(i)}$.

* * * * *